US010494223B2

(12) United States Patent
Sudo et al.

(10) Patent No.: US 10,494,223 B2
(45) Date of Patent: Dec. 3, 2019

(54) GROUP MANAGEMENT CONTROL DEVICE OF ELEVATOR, GROUP MANAGEMENT SYSTEM OF ELEVATOR, AND ELEVATOR SYSTEM

(71) Applicant: FUJITEC CO., LTD., Shiga (JP)

(72) Inventors: Takeshi Sudo, Shiga (JP); Akira Komura, Shiga (JP)

(73) Assignee: FUJITEC CO., LTD., Shiga (JP)

( * ) Notice: Subject to any disclaimer, the term of this patent is extended or adjusted under 35 U.S.C. 154(b) by 0 days.

(21) Appl. No.: 15/408,625

(22) Filed: Jan. 18, 2017

(65) Prior Publication Data
US 2017/0203938 A1 Jul. 20, 2017

(30) Foreign Application Priority Data

Jan. 20, 2016 (JP) .................................. 2016-008596

(51) Int. Cl.
*B66B 3/00* (2006.01)
*B66B 1/24* (2006.01)
*B66B 1/46* (2006.01)
*H04W 4/02* (2018.01)
*H04W 4/12* (2009.01)

(52) U.S. Cl.
CPC ............ *B66B 1/2458* (2013.01); *B66B 1/468* (2013.01); *H04W 4/023* (2013.01); *H04W 4/12* (2013.01); *B66B 2201/103* (2013.01); *B66B 2201/4607* (2013.01); *B66B 2201/4615* (2013.01); *B66B 2201/4653* (2013.01)

(58) Field of Classification Search
USPC ......................................................... 187/387
See application file for complete search history.

(56) References Cited

U.S. PATENT DOCUMENTS

| 6,419,051 | B2 * | 7/2002 | Mori ..................... | B66B 1/2458 |
|  |  |  |  | 187/247 |
| 6,945,365 | B2 * | 9/2005 | Matela ..................... | B66B 1/20 |
|  |  |  |  | 187/247 |
| 10,046,947 | B2 * | 8/2018 | Haipus .................... | B66B 1/468 |
| 2011/0127117 | A1 | 6/2011 | Amano |  |
| 2011/0155515 | A1 | 6/2011 | Suzuki et al. |  |
| 2017/0096318 | A1 * | 4/2017 | Garfinkel ................ | B66B 1/468 |

FOREIGN PATENT DOCUMENTS

| JP | 2013-144592 A | 7/2013 |
| JP | 2014-156356 A | 8/2014 |
| JP | 2015-174722 A | 10/2015 |
| JP | 2015-182819 A | 10/2015 |
| WO | 2010/032623 A1 | 3/2010 |
| WO | 2010/023723 A1 | 4/2010 |
| WO | 2015/191345 A1 | 12/2015 |

* cited by examiner

*Primary Examiner* — Christopher Uhlir
(74) *Attorney, Agent, or Firm* — Renner, Otto, Boisselle & Sklar, LLP

(57) ABSTRACT

When the received allocation request information indicates that the user information is obtained from the information communication terminal, the controller makes the storage unit store the allocation request information, and after elapse of a predetermined time from the reception of the allocation request information, reads the allocation request information to decide the allocation elevator to which the call relating to the allocation request information is to be allocated, and transmits information indicating the decided allocation elevator to the information communication terminal via a predetermined radio communication device.

8 Claims, 16 Drawing Sheets

ENTRANCE

Fig.12

| USER ID | DESTINATION FLOOR | USER ATTRIBUTION | SMARTPHONE TRANSMISSION DESTINATION INFORMATION |
|---|---|---|---|
| 00001 | 10 | ABLE-BODIED PERSON | Ax |
| 00002 | 8 | WHEELCHAIR | Ay |
| 00003 | 15 | ABLE-BODIED PERSON | — |
| ⋮ | ⋮ | ⋮ | ⋮ |

Fig.16

ESTIMATED MOVEMENT TIME TABLE FOR ABLE-BODIED PEOPLE

| DEVICE ID | ESTIMATED MOVEMENT TIME X(L) |
|---|---|
| 1 | 15 sec |
| 2 | 14 sec |
| 3 | 15 sec |
| 4 | 3 sec |
| ⋮ | ⋮ |

Fig.17

ESTIMATED MOVEMENT TIME TABLE FOR WHEELCHAIR USERS

| DEVICE ID | ESTIMATED MOVEMENT TIME X(L) |
|---|---|
| 1 | 30 sec |
| 2 | 28 sec |
| 3 | 30 sec |
| 4 | 6 sec |
| ⋮ | ⋮ |

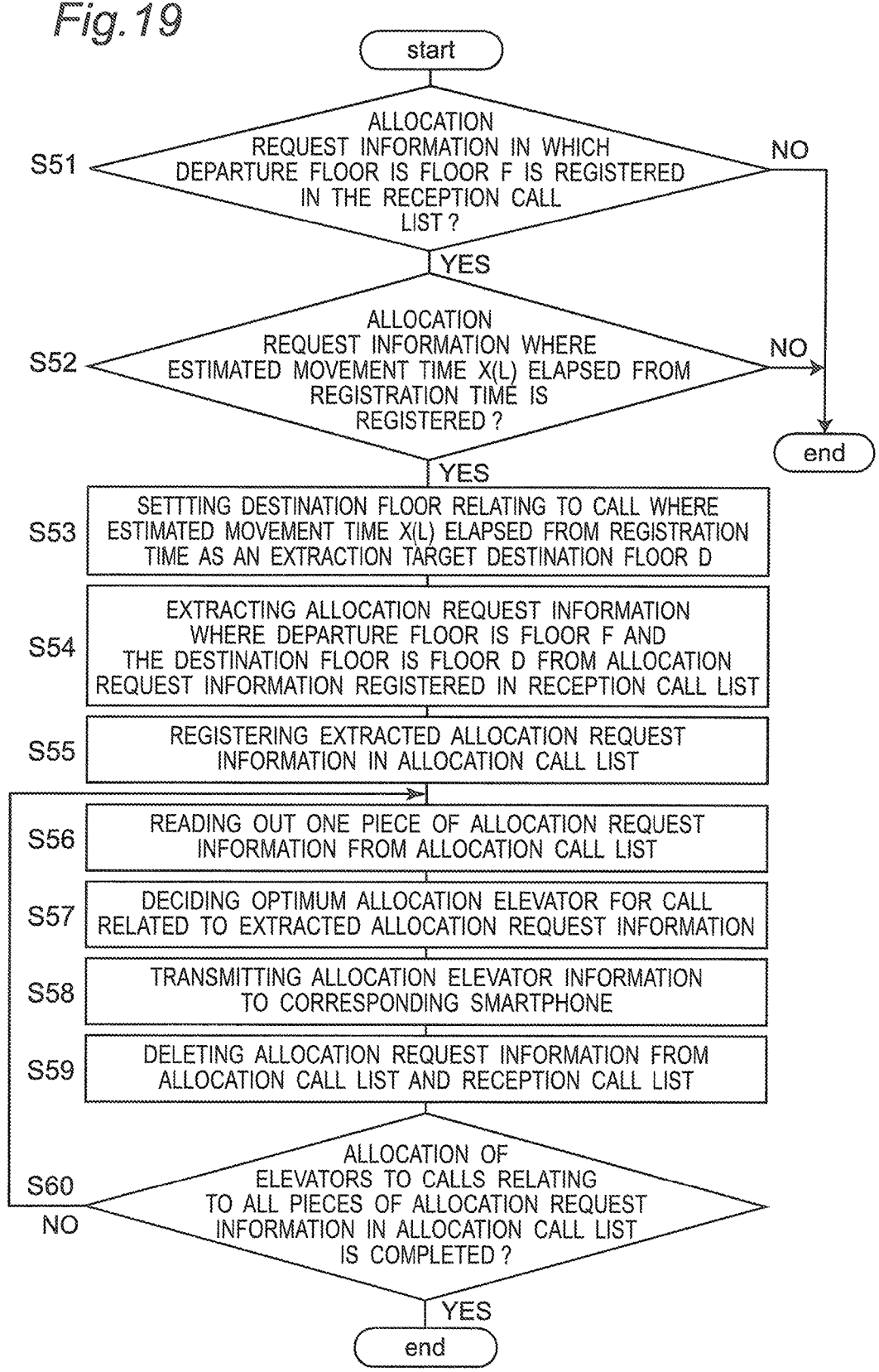

Fig.20
RECEPTION CALL LIST

| REGISTRATION TIME | DEPARTURE FLOOR | DESTINATION FLOOR | USER ATTRIBUTION | DEVICE ID | SMARTPHONE TRANSMISSION DESTINATION |
|---|---|---|---|---|---|
| 8:00:01.5 | 1 | 5 | ABLE-BODIED PERSON | 1 | A1 |
| 8:00:01.7 | 1 | 7 | ABLE-BODIED PERSON | 2 | A2 |
| 8:00:02.1 | 1 | 10 | ABLE-BODIED PERSON | 1 | A3 |
| 8:00:02.3 | 1 | 7 | ABLE-BODIED PERSON | 2 | A4 |
| 8:00:03.5 | 3 | 5 | ABLE-BODIED PERSON | 1 | A5 |
| 8:00:05.2 | 1 | 5 | ABLE-BODIED PERSON | 3 | A6 |
| 8:00:05.8 | 3 | 6 | ABLE-BODIED PERSON | 3 | A7 |

Fig.21
ALLOCATION CALL LIST

| REGISTRATION TIME | DEPARTURE FLOOR | DESTINATION FLOOR | USER ATTRIBUTION | DEVICE ID | SMARTPHONE TRANSMISSION DESTINATION |
|---|---|---|---|---|---|
| 8:00:01.5 | 1 | 5 | ABLE-BODIED PERSON | 1 | A1 |
| 8:00:05.2 | 1 | 5 | ABLE-BODIED PERSON | 3 | A6 |

Fig.22
ALLOCATION CALL LIST

| REGISTRATION TIME | DEPARTURE FLOOR | DESTINATION FLOOR | USER ATTRIBUTION | DEVICE ID | SMARTPHONE TRANSMISSION DESTINATION |
|---|---|---|---|---|---|
| 8:00:05.2 | 1 | 5 | ABLE-BODIED PERSON | 3 | A6 |

Fig.23
RECEPTION CALL LIST

| REGISTRATION TIME | DEPARTURE FLOOR | DESTINATION FLOOR | USER ATTRIBUTION | DEVICE ID | SMARTPHONE TRANSMISSION DESTINATION |
|---|---|---|---|---|---|
| 8:00:01.7 | 1 | 7 | ABLE-BODIED PERSON | 2 | A2 |
| 8:00:02.1 | 1 | 10 | ABLE-BODIED PERSON | 1 | A3 |
| 8:00:02.3 | 1 | 7 | ABLE-BODIED PERSON | 2 | A4 |
| 8:00:03.5 | 3 | 5 | ABLE-BODIED PERSON | 1 | A5 |
| 8:00:05.8 | 3 | 6 | ABLE-BODIED PERSON | 3 | A7 |

GROUP MANAGEMENT CONTROL DEVICE OF ELEVATOR, GROUP MANAGEMENT SYSTEM OF ELEVATOR, AND ELEVATOR SYSTEM

BACKGROUND

1. Technical Field

The present invention relates to a group management control device of elevator, a group management system of elevator, and an elevator system.

2. Related Art

Japanese Unexamined Patent Publication No. 2014-156356 discloses an elevator system that can register a user's destination floor in a manner that the user presents an information communication terminal such as a smartphone into which a dedicated call registration application is introduced, over a card reader (a command device) of a security turnstile (flapper gate).

SUMMARY

Some elevator users do not have information communication terminals into which such call registration applications can be introduced.

The present invention provides a group management control device of elevator, a group management system of elevator, and an elevator system that can provide appropriate services in situations where various users exist.

A group management control device of elevator according to a first mode of the present invention allocates a call relating to allocation request information for specifying a departure floor and a destination floor to any of a plurality of elevators. The allocation request information is generated by an allocation request generating device based on user information obtained by an information obtaining device disposed on or near a route to a boarding place.

The information obtaining device is configured to be capable of obtaining user information from an information communication terminal held by a user.

The allocation request generating device is configured to transmit the allocation request information in a form that a determination can be made whether the user information is obtained from the information communication terminal to the group management control device of elevator when the information obtaining device obtains the user information.

The group management control device includes a storage unit, and a controller that decides an allocation elevator to which the call relating to the allocation request information received from the allocation request generating device is allocated.

When the received allocation request information does not indicate that the user information is obtained from the information communication terminal, the controller immediately decides the allocation elevator to which the call relating to the allocation request information is allocated, and makes a notification device disposed near the information obtaining device notify of information indicating the decided allocation elevator. When the received allocation request information indicates that the user information is obtained from the information communication terminal, the controller makes a storage unit store the allocation request information, and after elapse of a predetermined time from the reception of the allocation request information, reads the allocation request information to decide the allocation elevator to which the call relating to the allocation request information is to be allocated. The controller transmits information indicating the decided allocation elevator to the information communication terminal via a predetermined radio communication device.

A group management system of elevator according to a second mode of the present invention includes an information obtaining device disposed on or near a route to a boarding place, an allocation request generating device that generates allocation request information specifying a departure floor and a destination floor based on user information obtained by the information obtaining device, and a group management control device that allocates a call relating to the allocation request information generated by the allocation request generating device to any elevator in a plurality of elevators.

The information obtaining device is configured to be capable of obtaining user information from an information communication terminal held by a user.

The allocation request generating device is configured to transmit the allocation request information in a form that a determination can be made whether the user information is obtained from the information communication terminal to the group management control device when the information obtaining device obtains the user information.

The group management control device includes a storage unit, and a controller that decides an allocation elevator to which the call relating to the allocation request information received from the allocation request generating device is allocated.

When the received allocation request information does not indicate that the user information is obtained from the information communication terminal, the controller immediately decides the allocation elevator to which the call relating to the allocation request information is allocated, and makes a notification device disposed near the information obtaining device notify of information indicating the decided allocation elevator. When the received allocation request information indicates that the user information is obtained from the information communication terminal, the controller makes a storage unit store the allocation request information, and after elapse of a predetermined time from the reception of the allocation request information, reads the allocation request information to decide the allocation elevator to which the call relating to the allocation request information is to be allocated. The controller transmits information indicating the decided allocation elevator to the information communication terminal via a predetermined radio communication device.

An elevator system according to a third mode of the present invention includes a plurality of elevators, and a group management control device that allocates a call relating to allocation request information, which is generated by an allocation request generating device based on user information obtained by an information obtaining device disposed on or near a route to a boarding place and specifies a departure floor and a destination floor, to any elevator in the plurality of elevators.

The information obtaining device is configured to be capable of obtaining user information from an information communication terminal held by a user.

The allocation request generating device is configured to transmit the allocation request information in a form that a determination can be made whether the user information is obtained from the information communication terminal to the group management control device when the information obtaining device obtains the user information.

The group management control device includes a storage unit, and a controller that decides an allocation elevator to which the call relating to the allocation request information received from the allocation request generating device is allocated.

When the received allocation request information does not indicate that the user information is obtained from the information communication terminal, the controller immediately decides the allocation elevator to which the call relating to the allocation request information is allocated, and makes a notification device disposed near the information obtaining device notify of information indicating the decided allocation elevator. When the received allocation request information indicates that the user information is obtained from the information communication terminal, the controller makes a storage unit store the allocation request information, and after elapse of a predetermined time from the reception of the allocation request information, reads the allocation request information to decide the allocation elevator to which the call relating to the allocation request information is to be allocated. The controller transmits information indicating the decided allocation elevator to the information communication terminal via a predetermined radio communication device.

Further, an elevator system according to a fourth mode of the present invention includes a plurality of elevators, an information obtaining device disposed on or near a route to a landing, an allocation request generating device that generates allocation request information specifying a departure floor and a destination floor based on user information obtained by the information obtaining device, and a group management control device that allocates a call relating to the allocation request information generated by the allocation request generating device to any elevator in a plurality of elevators.

The information obtaining device is configured so as to be capable of obtaining user information from an information communication terminal held by a user.

The allocation request generating device is configured so as to transmit the allocation request information in a form that a determination can be made whether the user information is obtained from the information communication terminal to the group management control device when the information obtaining device obtains the user information.

The group management control device includes a storage unit, and a controller that decides an allocation elevator to which the call relating to the allocation request information received from the allocation request generating device is allocated.

When the received allocation request information does not indicate that the user information is obtained from the information communication terminal, the controller immediately decides the allocation elevator to which the call relating to the allocation request information is allocated, and makes a notification device disposed near the information obtaining device notify of information indicating the decided allocation elevator. When the received allocation request information indicates that the user information is obtained from the information communication terminal, the controller makes a storage unit store the allocation request information, and after elapse of a predetermined time from the reception of the allocation request information, reads the allocation request information so as to decide the allocation elevator to which the call relating to the allocation request information is to be allocated. The controller transmits information indicating the decided allocation elevator to the information communication terminal via a predetermined radio communication device.

The present invention can provide an appropriate service in a situation where various users are present.

BRIEF DESCRIPTION OF DRAWINGS

FIG. 12 is a diagram illustrating a configuration of a user DB stored in a storage unit of the security server according to the first embodiment.

FIG. 16 is a diagram illustrating a configuration of an estimated movement time table for able-bodied people stored in the storage unit of the group management control device according to the first embodiment.

FIG. 17 is a diagram illustrating a configuration of an estimated movement time table for wheelchair users stored in the storage device of the group management control device according to the first embodiment.

FIG. 19 is a flowchart illustrating details of the allocating operation for the elevator according to the call (the allocation request information) registered in the reception call list in the group management control device according to the first embodiment.

FIG. 20 is a diagram illustrating one example of the reception call list stored in the storage unit of the group management control device.

FIG. 21 is a diagram illustrating one example of an allocation call list generated in the storage unit of the group management control device.

FIG. 22 is a diagram illustrating one example of the allocation call list generated in the storage unit of the group management control device.

FIG. 23 is a diagram illustrating one example of the reception call list stored in the storage unit of the group management control device (a state after the call in the allocation call list shown in FIG. 21 is allocated).

DETAILED DESCRIPTION OF PREFERRED EMBODIMENT

A group management system of elevator according to an embodiment of the present invention will be described with reference to the drawings.

First Embodiment

1. Configuration
1-1. Outline of Elevator System

Figure 1:
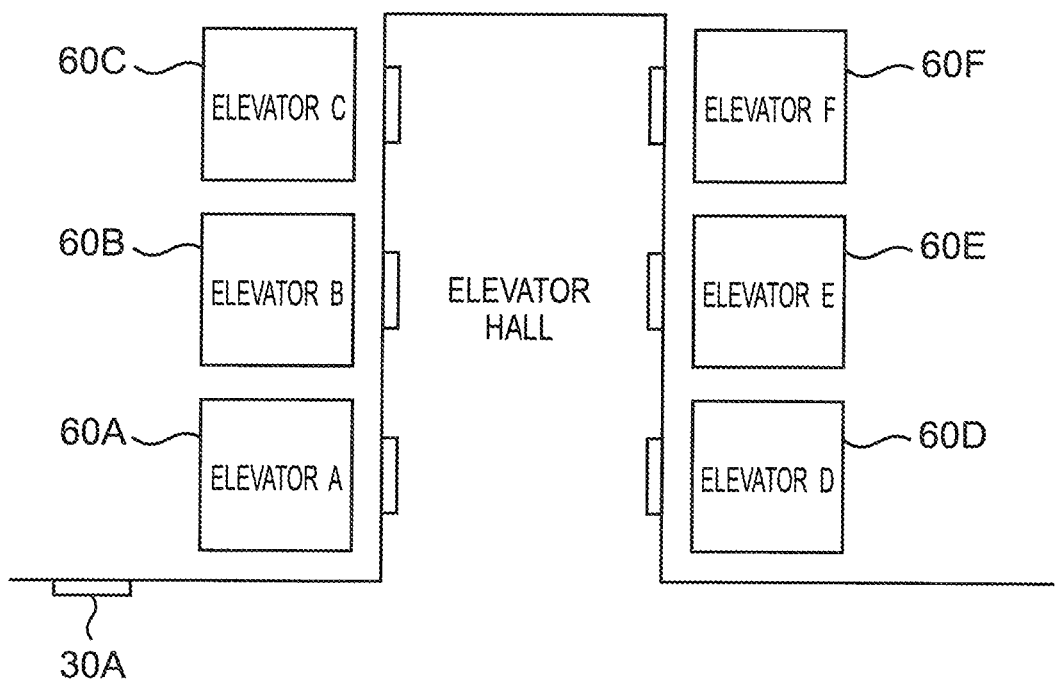
FIG. 1 is a schematic diagram illustrating a disposition of a specific floor of a building to which an elevator system according to a first embodiment is applied.
Figure 1:
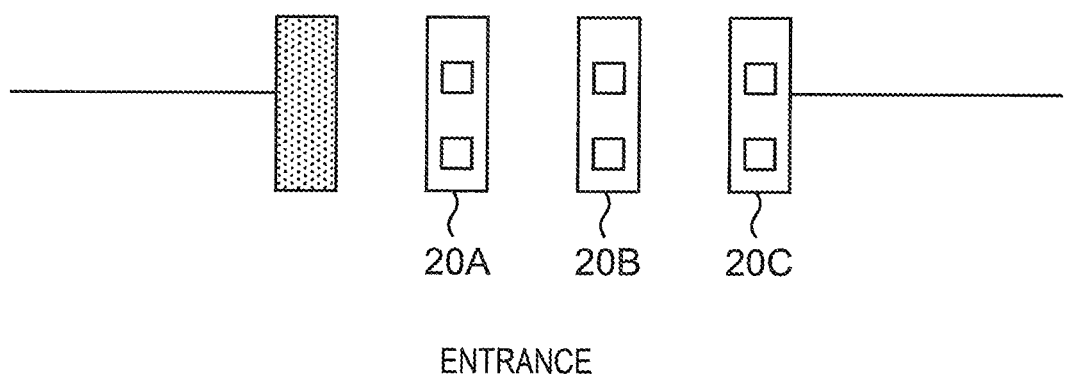

An outline of an elevator system according to the embodiment will be described. FIG. 1 is a schematic diagram illustrating a disposition of a specific floor of a building to which an elevator system according to the first embodiment is applied. The specific floor means, for example, a lobby floor to be connected to an outside of the building. A user of the building moves to a certain floor via the specific floor.

The elevator system according to this embodiment includes a plurality of elevators (cars) 60A to 60F, and a group management system. The group management system of elevator integrally controls traveling and operations of the elevators 60A to 60F. In this embodiment, as one example, the six elevators 60A to 60F (elevators (cars) A to F) are provided. Boarding doorways of the elevators 60A to 60F are provided to a side of an elevator hall (an elevator boarding place), and users board on the elevators 60A to 60F in the elevator hall. The plurality of elevators 60A to 60F has an identical or similar configuration. For this reason, when the elevators do not have to be discriminated in description of the configuration, each elevator is appropriately described as "the elevator 60".

In this embodiment, on a specific floor such as a lobby floor of a building, a plurality of security turnstiles 20A to 20C is disposed on a route from an entrance (an entrance hall) to an elevator hall (an elevator boarding place). The plurality of security turnstiles 20A to 20C has an identical or similar configuration. For this reason, when the security turnstiles do not have to be discriminated in the description of the configuration, each security turnstile is appropriately described as "the security turnstile 20". A user passes through any security turnstile 20 from the entrance side and enters the elevator hall.

In the building, a region that is closer to the elevator hall than the security turnstiles 20A to 20C is appropriately referred to as "a specific region" in some cases. The specific region in the building is a region where users cannot enter without passing through the security turnstiles 20A to 20C from the entrance side. For this reason, the specific region may include not only the elevator hall but also a space in a car of each elevator 60 and a space on each floor where the users can move with elevators 60.

Further, a destination floor registration device 30A is disposed near a route to the elevator hall (the elevator boarding place) on the specific floor. Floors without the security turnstiles 20 other than the specific floor are provided with destination floor registration devices 30B to 30Z, respectively, (see FIG. 2). The plurality of destination floor registration devices 30A to 30Z has an identical or similar configuration. For this reason, when the destination floor registration devices do not have to be discriminated in the description of the configuration, each destination floor registration device is described as "the destination floor registration device 30".

The group management system of elevator according to this embodiment employs a destination floor registering method in which the user registers a destination floor using the security turnstile 20 and the destination floor registration device 30 in advance before boarding the car of the elevator 60. The group management system, then, allocates a call of the destination floor registered in advance (a destination floor call) to any elevator in the plurality of elevators 60, notifies the user of information indicating the allocated elevator, and allows the user to board the allocated elevator. Concrete control will be described later. The destination floor registration device 30A on the specific floor is provided in order to enable the user, who enters the elevator hall, to register any destination floor when the user misses the specified elevator 60 or moves to a floor that is not related to a user ID registered in an ID card or a smartphone.

1-2. Configuration of Group Management System of Elevator
1-2-1. Outline

Figure 2:
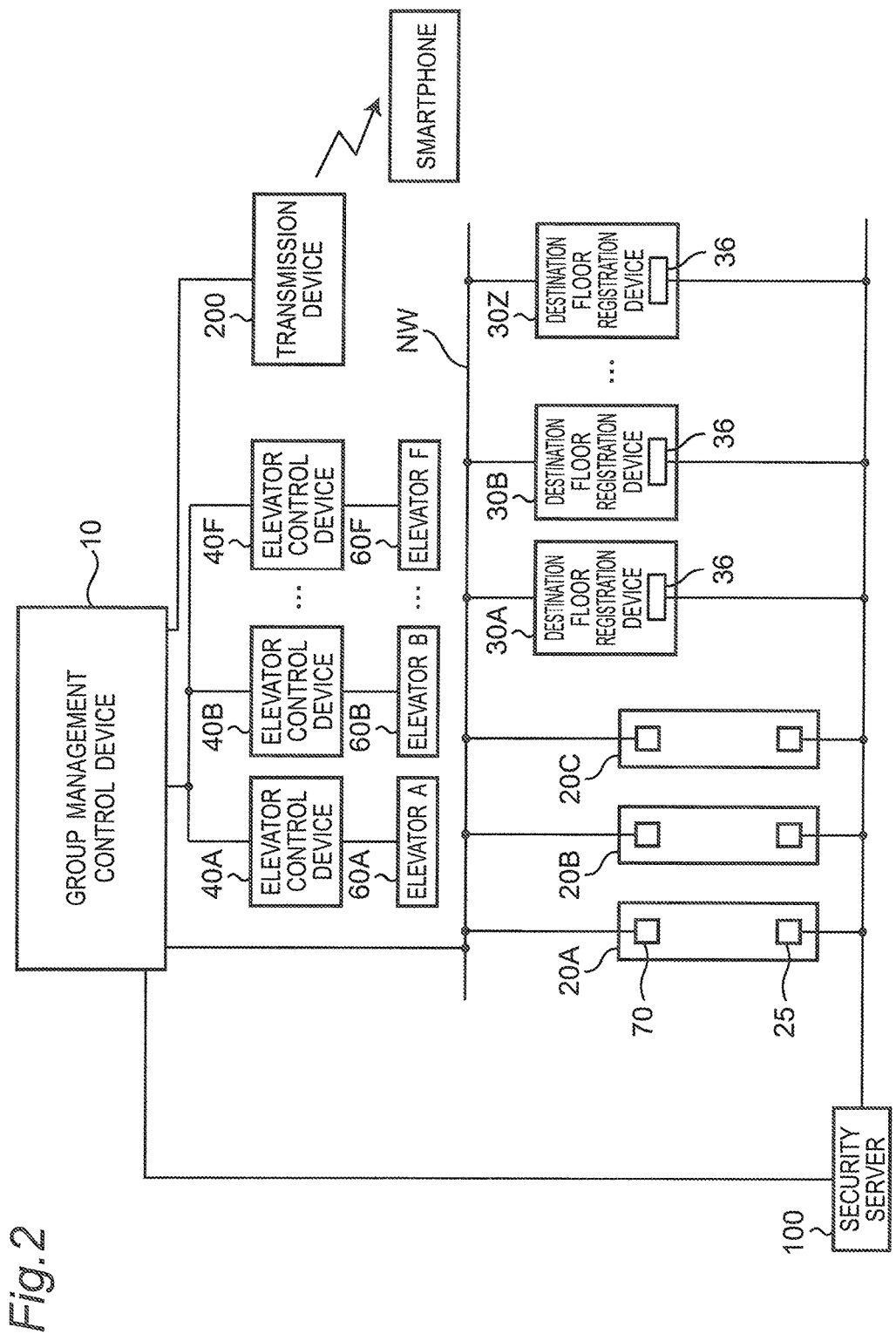
FIG. 2 is a block diagram illustrating a configuration of a group management system of elevator according to the first embodiment.

The configuration of the group management system of elevator according to this embodiment will be described. FIG. 2 is a block diagram illustrating the configuration of the group management system of elevator according to the first embodiment. The group management system of elevator according to this embodiment includes a group management control device 10, the plurality of destination floor registration devices 30A to 30Z, a plurality of elevator control devices 40A to 40F, turnstile displays 70, and a transmission device 200. The turnstile displays 70 are provided to the security turnstiles 20.

While communicating with the security server 100, the group management system of elevator controls allocation of new destination floor calls to the respective elevators. The respective devices are connected to each other via a network NW that can transmit information. The network NW is configured by LAN (Local Area Network) such as Ethernet (registered trademark), and various information between the devices is transmitted/received according to various protocols such as TCP/IP (Transmission Control Protocol/Internet Protocol). The respective devices connected to the network NW can transmit signals via communication (information transmission) between the devices by input/output interfaces of the respective devices according to various protocols such as TCP/IP. The devices configuring the group management system may be connected to each other via a network of another signal form or a dedicated signal network.

Each of the elevators (respective elevators) 60A to 60F has a car, a winding machine (a motor), and a balance weight.

1-2-2. Group Management Control Device

The group management control device 10 makes a control to allocate a destination floor to any elevator from the plurality of the elevators 60A to 60F. The destination floor is related to a user ID (user information) read from an ID card or a smartphone in a card reader 25 of the security turnstile 20 or a card reader 36 of the destination floor registration device 30. In another manner, the destination floor is input by the destination floor registration device 30.

Figure 3:
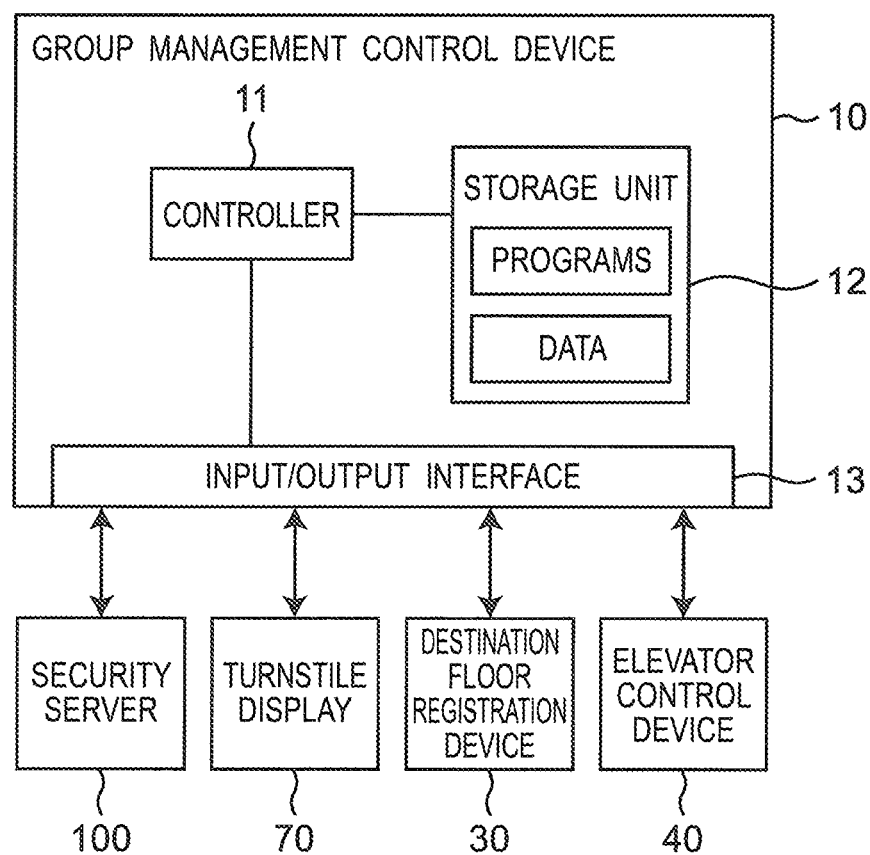
FIG. 3 is a block diagram illustrating an electrical configuration of a group management control device according to the first embodiment.

FIG. 3 is a block diagram illustrating an electrical configuration of the group management control device 10 according to the first embodiment.

The group management control device 10 is configured by a computer, and includes a controller 11, a storage unit 12, and an input/output interface 13.

The storage unit 12 is configured by, for example, RAM (a Random-Access Memory), ROM (a Read-Only Memory), HDD (a Hard Disc Drive), or SSD (a Solid-State Disc), and stores programs and various data. The programs include programs that realize various functions of the group management control device 10 according to this embodiment. The storage unit 12 stores, for example, an estimated movement time table for able-bodied people and an estimated movement time table for wheelchair users as data. The configurations of these tables will be described later.

The controller 11 is configured by, for example, CPU or MPU. The controller 11 executes a calculating process using various data based on the program read from the storage unit 12 to realize various functions, described later, in the group management control device 10.

The input/output interface 13 is configured by, for example, a LAN adaptor. The input/output interface 13 is an interface that transmits/receives various signals between the group management control device 10, the security server 100, the turnstile display 70 of the security turnstile 20, the destination floor registration device 30 (30A to 30Z), and the elevator control device 40 (40A to 40F). The input/output interface 13 converts a signal output from the controller 11 into a signal of a predetermined format to output the converted signal to the security server 100, the turnstile display 70 of the security turnstile 20, the destination floor registration device 30, and the elevator control device 40. Further, the input/output interface 13 converts signals input from the security server 100, the turnstile display 70 of the security turnstile 20, the destination floor registration device 30, and the elevator control device 40 into signals of a predetermined format to output the converted signals to the controller 11.

1-2-3. Destination Floor Registration Device

Figure 4:
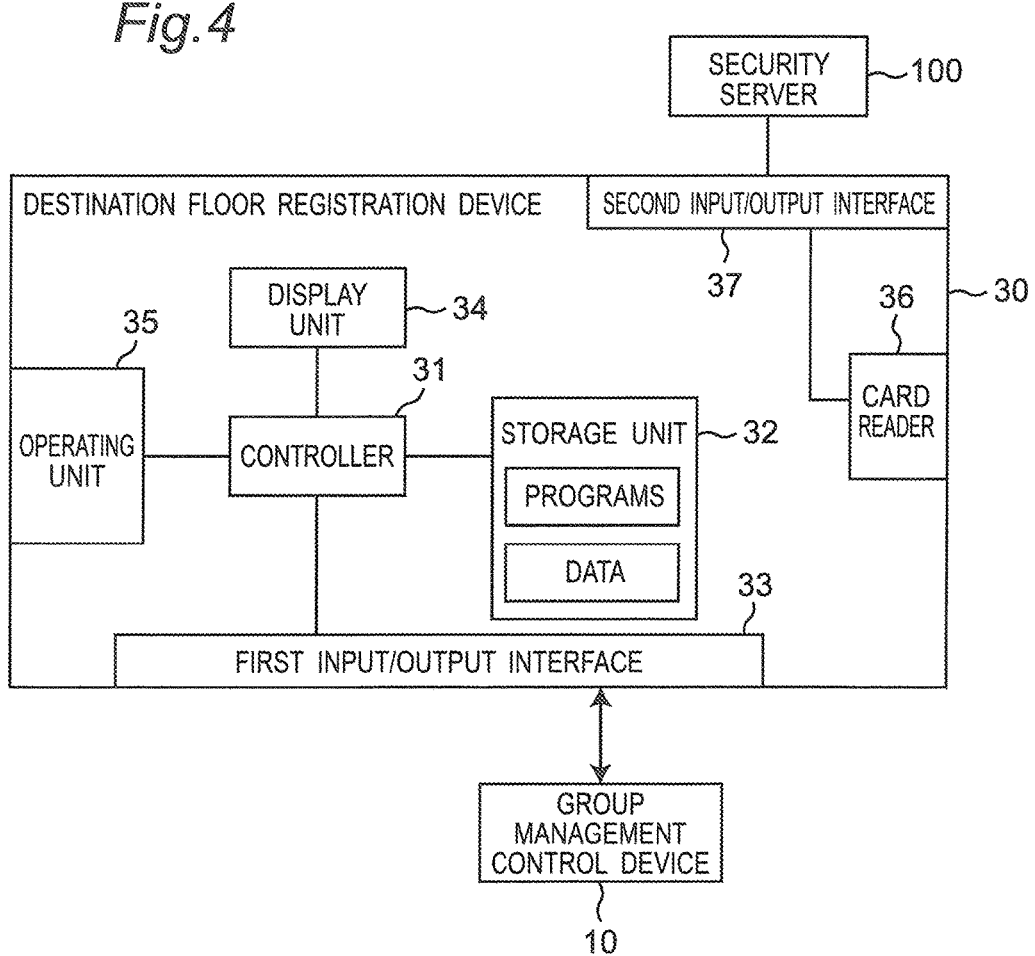
FIG. 4 is a block diagram illustrating an electric configuration of a destination floor registration device according to the first embodiment.

FIG. 4 is a block diagram illustrating an electric configuration of the destination floor registration device 30 according to the first embodiment. The destination floor registration device 30 is a device with which the user registers a destination floor. The destination floor registration device 30 includes a controller 31, a storage unit 32, a first input/output interface 33, a display unit 34, an operating unit 35, the card reader 36, and a second input/output interface 37.

The storage unit 32 is configured by, for example, RAM, ROM, HDD, or SSD, and stores programs and various data. The programs include programs that realize various functions of the destination floor registration device 30 according to this embodiment. The storage unit 32 stores, for example, device identification information of the destination floor registration device 30 (hereinafter, appropriately referred to as "device ID") as the data.

The controller 31 is configured by, for example, CPU or MPU. The controller 31 executes calculating processes using various data based on the programs read from the storage unit 32 to realize various functions, described later, in the destination floor registration device 30.

The first input/output interface 33 is configured by, for example, a LAN adaptor. The first input/output interface 33 is an interface that transmits/receives various signals between the destination floor registration device 30 and the group management control device 10. The first input/output interface 33 converts signals output from the controller 31 into signals of predetermined format to output the converted signals to the group management control device 10. Further, the first input/output interface 33 converts signals input from the group management control device 10 into signals of predetermined format to output the converted signals to the controller 31.

The second input/output interface 37 is configured by, for example, a LAN adaptor. The second input/output interface 37 is an interface that transmits/receives various signals between the card reader 36 of the destination floor registration device 30 and the security server 100. The second input/output interface 37 converts signals output form the card reader 36 of the destination floor registration device 30 into signals of predetermined format to output the converted signals to the security server 100.

The card reader 36 can be configured by, for example, an electromagnetic induction type non-contact or contact reader, an NFC (Near Field Communication) reader, or an IC tag reader communicable with an IC tag.

The card reader 36 includes a controller, a storage unit, an input/output interface, and a reader main body. The controller executes a calculating process on various data based on the programs stored in the storage unit, to realize various functions in the card reader 36. The storage unit stores, for example, a device ID of the destination floor registration device 30 in which the card reader 36 is disposed as the data.

The operating unit 35 is an interface with which the user inputs a destination floor. The operating unit 35 outputs a signal corresponding to an operation to the operating unit 35 to the controller 31.

The display unit 34 performs display based on a display signal output from the controller 31.

In this embodiment, the display unit 34 and the operating unit 35 are configured integrally by, for example, a touch panel type display device using a liquid crystal display panel or an organic EL display panel. The display unit 34 and the operating unit 35 may be configured separately by different parts.

Figure 5:
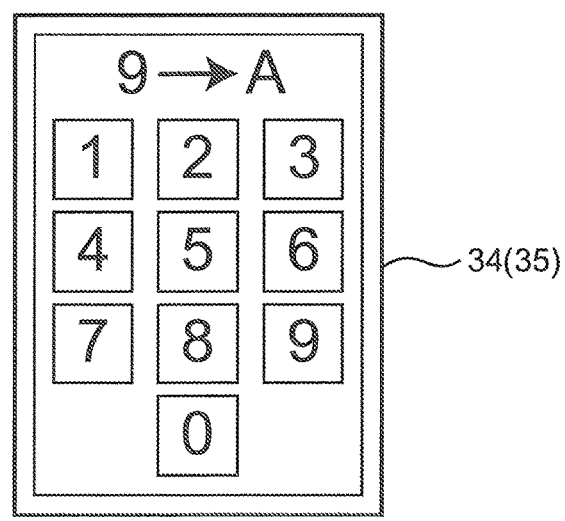
FIG. 5 is a diagram illustrating a display example of a display unit of the destination floor registration device in the group management system of elevator according to the first embodiment.

FIG. 5 is a diagram illustrating a display example of the display unit 34 of the destination floor registration device 30 in the group management system of elevator according to the first embodiment. In this example, a numeric keypad for specifying a number of a floor is displayed. FIG. 5 illustrates that a 9th floor is specified and the elevator A is allocated. When a destination floor is input through the operating unit 35, the destination floor registration device 30 displays the input destination floor. Thereafter, when receiving allocated elevator information related to the destination floor registration device 30 from the group management control device 10, the allocation elevator information that is related to the currently displayed destination floor is displayed as shown in FIG. 5. The destination floor registration device 30 occasionally receives guidance information from the group management control device 10, and in this case, the destination floor registration device 30 allows the display unit 34 to display guidance information shown in FIG. 10B, described later.

1-2-4. Elevator Control Device

The elevator control devices 40A to 40F control operations of the winding machines (the motors) of the corresponding elevators 60A to 60F according to control signals from the group management control device 10 to control ascent, descent, and stop of the cars of the elevators 60A to 60F. Further, the elevator control devices 40A to 40F detect car states such as positions and traveling directions of the cars, open/close states of doors, and loads of the corresponding elevators 60A to 60F, and outputs car state signals including information indicating the detected car states to the group management control device 10. The plurality of elevator control devices 40A to 40F has an identical or similar configuration. For this reason, when the elevator control devices do not have to be discriminated in description of the configuration, each elevator control device is appropriately described as "the elevator control device 40".

Figure 6:
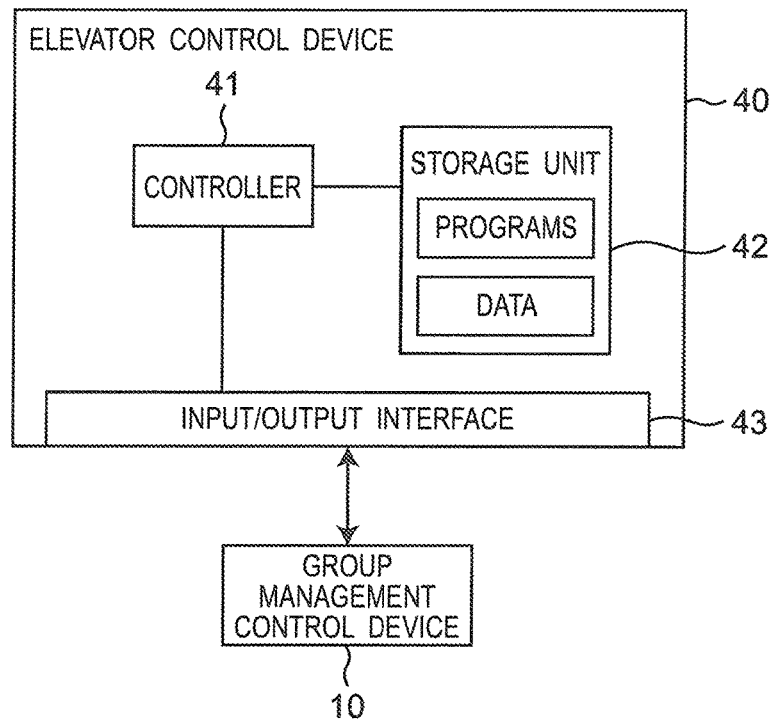
FIG. 6 is a block diagram illustrating an electric configuration of an elevator control device according to the first embodiment.

FIG. 6 is a block diagram illustrating an electric configuration of the elevator control device according to the first embodiment. Each elevator control device 40 (the elevator control devices 40A to 40F) has a controller 41, a storage unit 42, and an input/output interface 43.

The storage unit 42 is configured by, for example, RAM, ROM, HDD, or SSD, and stores programs and various data. The programs include programs that realize various functions of the elevator control device 40 according to this embodiment.

The controller 41 is configured by, for example, CPU or MPU. The controller 41 executes a calculating process by using the various data based on the programs read from the storage unit 42 to realize various functions in the elevator control device 40.

The input/output interface 43 is configured by, for example, a LAN adaptor. The input/output interface 43 is an interface that transmits/receives various signals between the elevator control device 40 and the group management control device 10. The input/output interface 43 converts signals output from the controller 41 into signals of predetermined format to output the converted signals to the group management control device 10. Further, the input/output interface 43 converts the signals input from the group management control device 10 into signals of predetermined format to output the converted signals to the controller 41.

1-2-5. Security Turnstile

The security turnstile 20 is a device that permits or regulates entry of a user in a specific region. The security turnstile 20 is provided as a security facility of a building. The security turnstile 20 permits only users who have ID cards in which authorized user IDs are registered or smartphones in which authorized user IDs are registered (hereinafter, appropriately referred to as "ID cards or smartphones in which authorized user IDs are registered") to enter the specific region.

Figure 7:
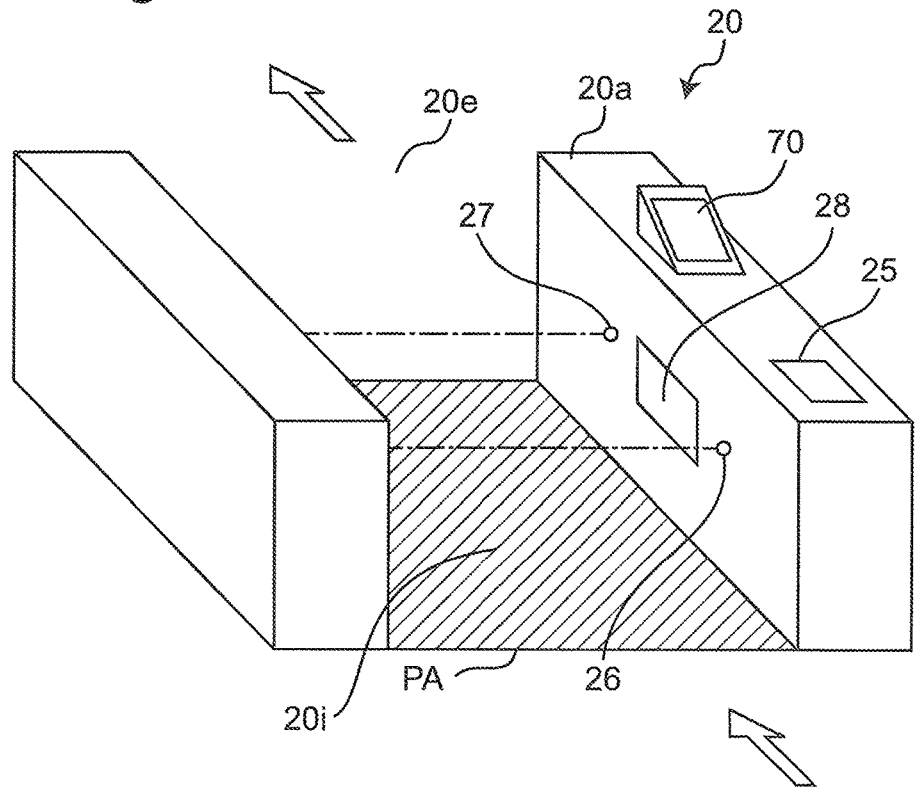
FIG. 7 is a perspective view illustrating an appearance of a security turnstile according to the first embodiment.

FIG. 7 is a perspective view illustrating an appearance of a first example of the security turnstile 20 according to the first embodiment. FIG. 7 illustrates an example of the security turnstile 20A (20) on a left end side in FIG. 1. The security turnstile 20 includes a gate main body 20*a*, a first sensor 26, a second sensor 27, a card reader 25, the turnstile display 70, and a gate flapper 28.

The first sensor 26, the second sensor 27, the card reader 25, and the turnstile display 70 are mounted to an outer surface of the gate main body 20*a*. The gate main body 20*a* is a case that houses a controller 21, described later, and the like. The gate main body 20*a* is disposed along an entrance direction of a user. The gate main body 20*a* is disposed with a predetermined distance being spaced apart from the gate main body of the adjacent security gate 20, and a passage PA through which a user can pass is formed beside the gate main body 20*a*.

The card reader 25 is disposed on a side of an entrance 20*i* on an upper surface of the gate main body 20*a*. The card reader 25 is a reader that reads a user ID recorded in an ID card or a smartphone of a user who enters the passage PA of the security turnstile 20 from side of the entrance 20*i*. The card reader 25 can be configured by, for example, an electromagnetic induction type noncontact or contact reader, an NFC (Near Field Communication) reader, or an IC tag reader that is communicable with an IC tag.

The card reader 25 includes a controller, a storage unit, an input/output interface, and a reader main body. The controller executes the calculating process on various data based on the programs stored in the storage unit to realize various functions in the card reader 25. The storage unit stores, for example, a device ID of the security turnstile 20 in which the card reader 25 is disposed as the data.

The turnstile display 70 displays allocation elevator information. A detailed configuration of the turnstile display 70 will be described later.

The first sensor 26 detects a movement of the user on the side of the entrance 20*i* in the passage PA of the security turnstile 20. When detecting the movement of the user, the first sensor 26 and the second sensor 27 output a detection signal.

The second sensor 27 detects a movement of the user on the side of an exit 20*e* in the passage PA of the security turnstile 20. When detecting the movement of the user, the first sensor 26 and the second sensor 27 output a detection signal.

The gate flapper 28 is an openable/closable door. The gate flapper 28 enables the user to pass through the security turnstile 20 in the open state. The gate flapper 28 prevents the user from passing through the security turnstile 20 in the close state.

Figure 8:
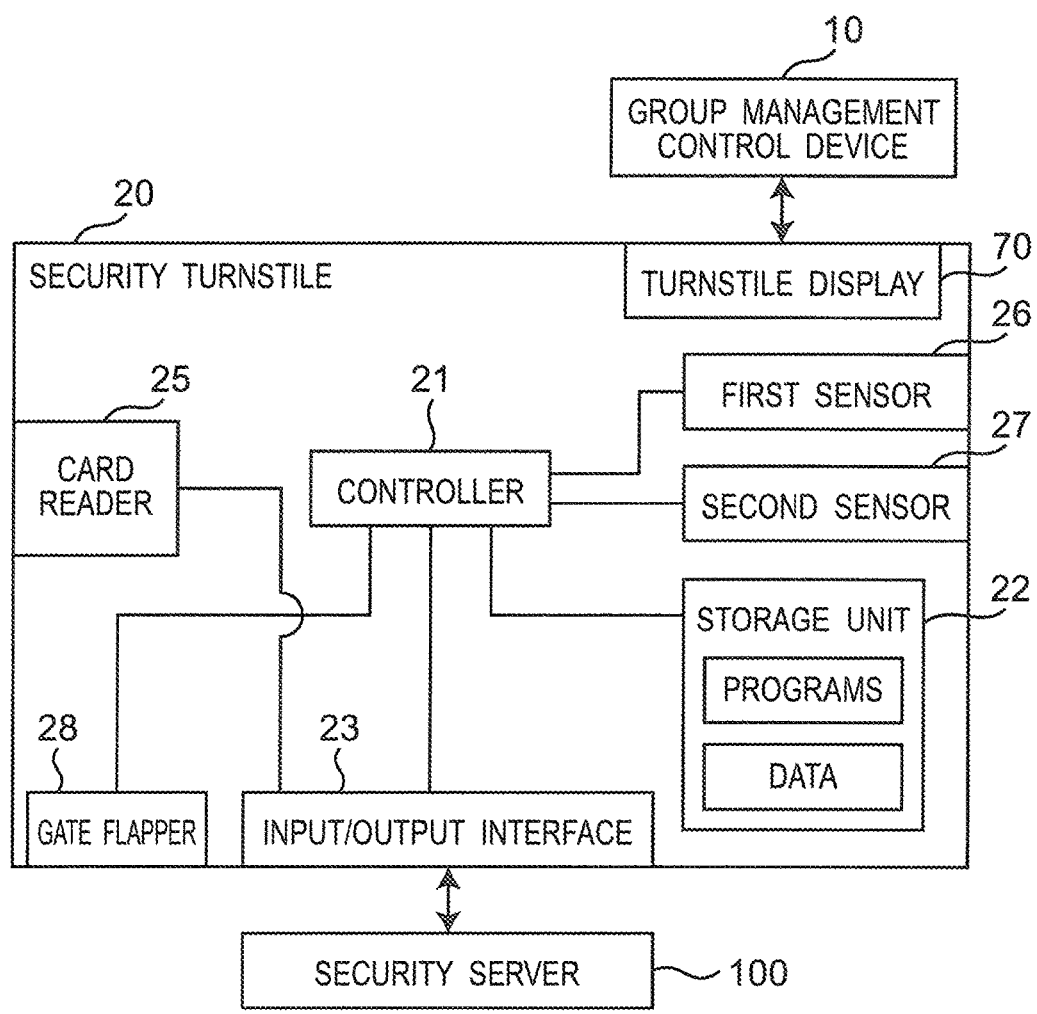
FIG. 8 is a block diagram illustrating an electric configuration of the security turnstile according to the first embodiment.

FIG. 8 is a block diagram illustrating an electric configuration of the security turnstile 20 according to the first embodiment. The security turnstile 20 further includes the controller 21, a storage unit 22, and an input/output interface 23 besides the above-mentioned components.

The storage unit 22 is configured by, for example, RAM, ROM, HDD, or SSD, and stores programs and various data. The programs include programs that realize various functions of the security turnstile 20 according to this embodiment.

The controller 21 is configured by, for example, CPU or MPU. The controller 21 executes the calculating process using the various data based on the programs stored in the storage unit 22 to realize various functions, described later, in the security turnstile 20.

The controller 21 opens/closes the gate flapper 28 based on the detection signals from the first sensor 26 and the second sensor 27, and a gate OPEN signal and a gate CLOSE signal from the security server 100.

When reading a user ID recorded in the ID card or the smartphone, the card reader 25 transmits the read user ID and a device ID of the security turnstile 20 to the security server 100.

The input/output interface 23 is configured by, for example, a LAN adaptor. The input/output interface 23 is an interface that transmits/receives various signals between the security turnstile 20 and the security server 100. The input/output interface 23 converts signals output from the controller 21 and the card reader 25 into signals of predetermined format to output the converted signals to the security server 100. Further, the input/output interface 23 converts the signals input from the security server 100 into signals of predetermined format to output the converted signals to the controller 21.

1-2-6. Turnstile Display

The turnstile display 70 is a display that is installed on the security turnstile 20 and presents information indicating an elevator allocated by the group management control device 10 and another information relating to the allocation to the user. The turnstile display 70 is installed on the security turnstile 20, but as a system, the turnstile display 70 is a part of the group management system of elevator.

Figure 9:
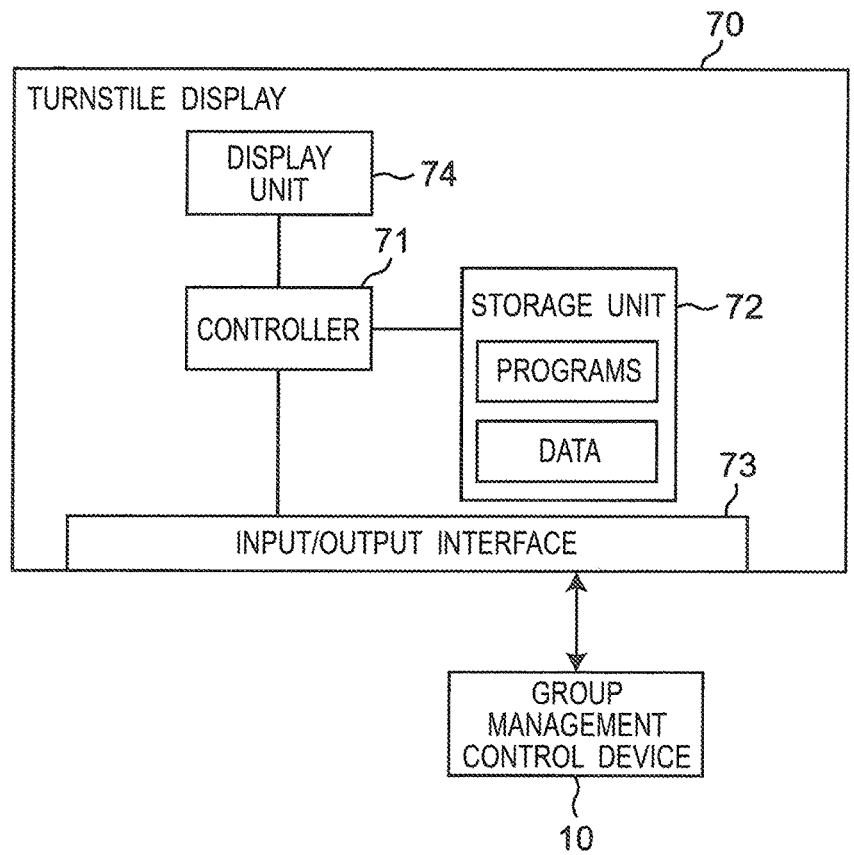
FIG. 9 is a block diagram illustrating an electric configuration of a turnstile display according to the first embodiment.

FIG. 9 is a block diagram illustrating an electric configuration of the turnstile display 70 according to the first embodiment. The turnstile display 70 is configured by a computer so that display control can be made based on the information received from the group management control device 10. The turnstile display 70 includes a controller 71, a storage unit 72, an input/output interface 73, and a display unit 74 as shown in FIG. 9.

The storage unit 72 is configured by, for example, RAM, ROM, HDD, or SSD, and stores programs and various data. The programs include programs that realize various functions, described later, of the turnstile display 70 according to this embodiment.

The controller 71 is configured by, for example, CPU or MPU. The controller 71 performs the calculating process using the various data based on the programs read from the storage unit 72 to realize the various functions, described later, in the turnstile display 70.

The input/output interface 73 is configured by, for example, a LAN adaptor. The input/output interface 73 is an interface that transmits/receives various signals between the turnstile display 70 and the group management control device 10. The input/output interface 73 converts signals output from the controller 71 into signals of predetermined format to output the converted signals to the group management control device 10. Further, the input/output interface 73 converts the signals input from the group management control device 10 into signals of predetermined format to output the converted signals to the controller 71.

The display unit 74 is configured by, for example, a liquid crystal display panel or an organic EL display panel.

Figure 10A:
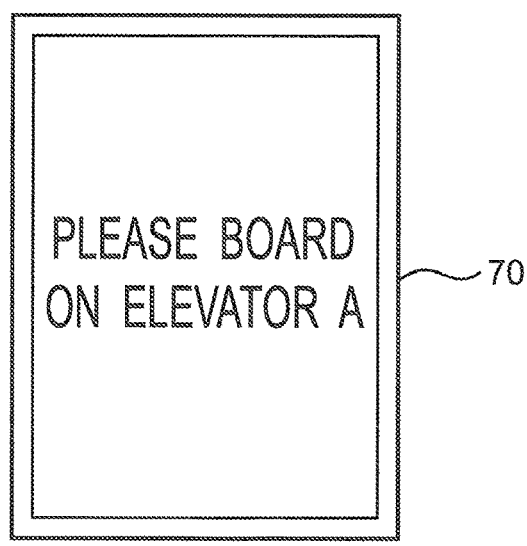
FIG. 10A is a diagram illustrating a display example of the turnstile display installed on the security turnstile according to the first embodiment.
Figure 10B:
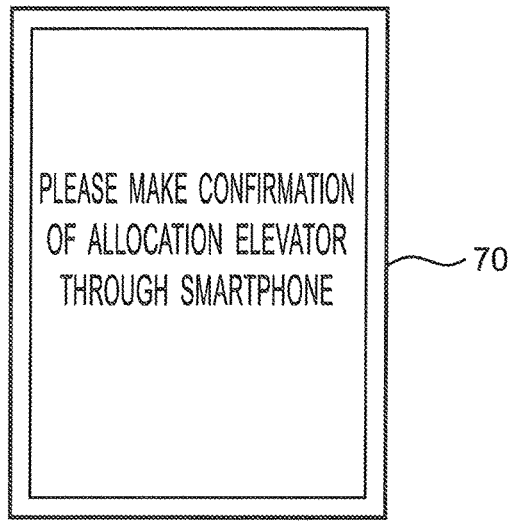
FIG. 10B is a diagram illustrating a display example of the turnstile display installed on the security turnstile according to the first embodiment.

FIG. 10A and FIG. 10B are diagrams illustrating display examples of the turnstile display 70 in the elevator group management system according to the first embodiment. In the example shown in FIG. 10A, the turnstile display 70 displays information indicating that the elevator A is allocated. Further, in the example shown in FIG. 10B, the turnstile display 70 displays guidance information for urging a confirmation of an allocation elevator through a smartphone.

1-2-7. Security Server

The security server 100 performs authentication based on a user ID read by the card reader 25 of the security turnstile 20 or the card reader 36 of the destination floor registration device 30. When the card reader 25 of the security turnstile 20 reads the user ID, the security server 100 transmits a gate OPEN signal or a gate CLOSE signal to the controller 21 of the security turnstile 20 based on an authenticated result. Further, the security server 100 generates allocation request information (departure floor information, destination floor information, user attribute information, and device ID) based on the user ID to output the information to the group management control device 10.

Figure 11:
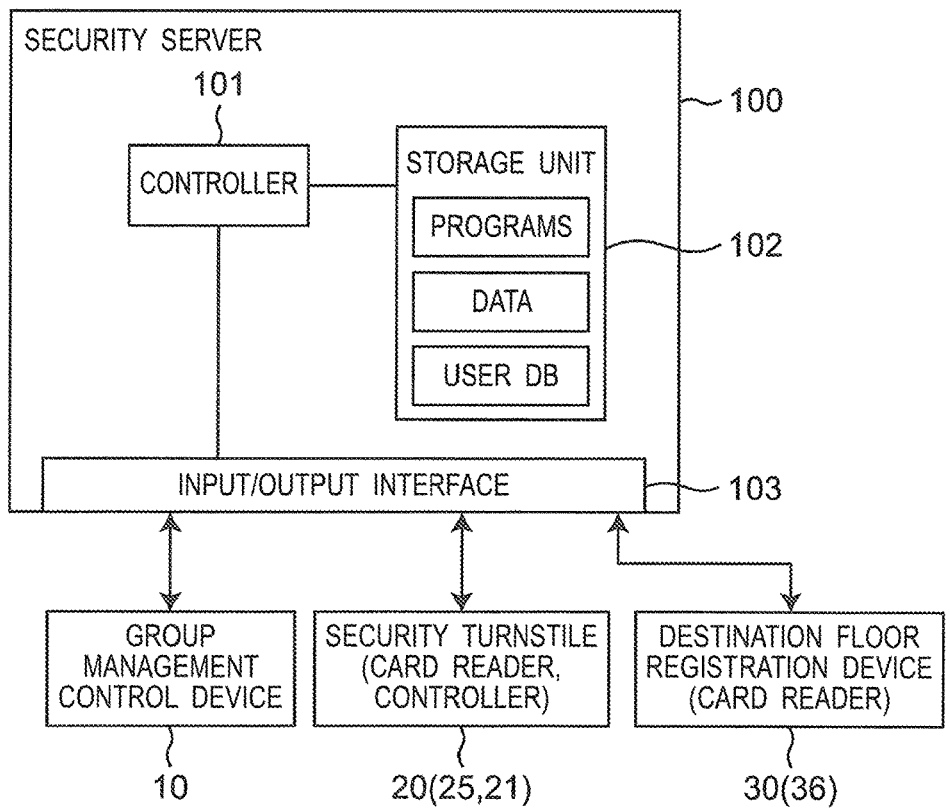
FIG. 11 is a block diagram illustrating an electric configuration of a security server according to the first embodiment.

FIG. 11 is a block diagram illustrating an electric configuration of the security server 100 according to the first embodiment. The security server 100 is configured by a computer, and includes a controller 101, a storage unit 102, and an input/output interface 103.

The storage unit 102 is configured by, for example, RAM, ROM, HDD, or SSD, and stores programs and various data. The programs include programs that realize various functions, described later, of the security server 100 according to this embodiment. The storage unit 102 stores a user database (hereinafter, referred to as "a user DB") as data. A configuration of the user DB will be described later.

Further, the storage unit 102 stores installation floor information indicating an installation floor of the security turnstile 20 as the data. The installation floor information is used as the departure floor information of the user who has passed through the security turnstile 20. When the security turnstile 20 is installed on a plurality of floors, an installation floor information table may be stored in the storage unit 102. For example, the device ID of the security turnstile 20 and the installation floor information are recorded in the installation floor information table with the device ID being related to the installation floor information. In this case, when the device ID is received from the security turnstile 20, the installation floor information related to the device ID is obtained from the installation floor information table, and the obtained installation floor information may be used as the departure floor information.

Further, the storage unit 102 stores the installation floor information indicating the installation floors of the destination floor registration devices 30 (30A to 30Z) as the data. The installation floor information is used as the departure floor information of the user who has registered the destination floor through the card reader 36 of the destination floor registration device 30. Since the destination floor registration device 30 is installed on a plurality of floors, the device IDs of the destination floor registration devices 30 (30A to 30Z) and the installation floor information may be related to each other to be recorded in an installation floor table, and the installation floor table may be stored in the storage unit 102. In this case, when the device ID is received from the destination floor registration device 30 (30A to 30Z), the installation floor information related to the device ID is obtained from the installation floor information table, and the obtained installation floor information may be used as the departure floor information.

The controller 101 is configured by, for example, CPU or MPU. The controller 101 executes the calculating process using the various data based on the programs read from the storage unit 102 to realize the various functions, described later, in the security server 100.

The input/output interface 103 is configured by, for example, a LAN adaptor. The input/output interface 103 is an interface that transmits/receives various signals between the security server 100, the group management control device 10, the destination floor registration device 30 (the card reader 36), and the security turnstile 20 (the card reader 25 and the controller 21). The input/output interface 103 converts signals output from the controller 101 into signals of predetermined format to output the converted signals to the group management control device 10, the destination floor registration device 30 (the card reader 36), and the security turnstile 20 (the card reader 25 and the controller 21). Further, the input/output interface 103 converts the signals input from the group management control device 10, the destination floor registration device 30 (the card reader 36), and the security turnstile 20 (the card reader 25 and the controller 21) into signals of predetermined format to output the converted signals to the controller 101.

FIG. 12 is a diagram illustrating a configuration of a user DB stored in the storage unit 102 of the security server 100 according to the first embodiment. The user DB stores the user ID registered in the ID card or the smartphone, the destination floor information, the user attribution information, and transmission destination information of the smartphone (hereinafter, referred to as "smartphone transmission destination information") in a related manner. These pieces of information are set by, for example, a building administrator in advance.

The user ID is information that is set uniquely for each elevator user and identifies the user.

The destination floor information is information indicating a destination floor to be mainly used by the user. For example, when the building is an office building, a number of a floor of a company where the user works is set, and when the building is an apartment, a number of a floor where the user lives is set.

The user attribution information is information indicating whether the user is an able-bodied person or a wheelchair user. When the user is an able-bodied person, "able-bodied person" is registered as the user attribution information into the user DB. When the user is a wheelchair user, "wheelchair user" is registered as the user attribution information into the user DB.

The smartphone transmission destination information is information such as a mail address, a telephone number, and a terminal ID related to a corresponding smartphone, and is used for transmitting the allocation elevator information to the smartphone.

In the example shown in FIG. 12, "10th floor", "able-bodied person", and "Ax" are related to a user ID "00001" to be recorded as the destination floor information, the user attribution information, and the smartphone transmission destination information. "8th floor", "wheelchair", and "Ay" are related to a user ID "00002" to be recorded as the destination floor information, the user attribution information, and the smartphone transmission destination information. "15th floor" and "able-bodied person" are related to a user ID "00003" to be recorded as the destination floor information and the user attribution information. The smartphone transmission destination information is not registered for the user ID "00003". Similarly, the corresponding destination floor information or the like is recorded for the other user IDs.

1-2-8. Transmission Device

The transmission device 200 is a device that radio-transmits the allocation elevator information decided by the controller 11 of the group management control device 10 to a user's smartphone. As a method of transmission to the smartphone, publicly-known various methods can be used. For example, as a radio system for transmission, any radio systems such as LTE and wireless LAN may be used as long as a smartphone can be used. Further, a form of the transmission may be, for example, transmission through an e-mail such as SMS or MMS, or transmission through a dedicated application installed on a smartphone, and any form of the transmission may be used as long as the allocation elevator information can be transmitted.

1-2-9. Smartphone

A smartphone, which is used for authentication by the card reader 25 of the security turnstile 20 and the card reader 36 of the destination floor registration device 30 in the group management system according to this embodiment, may have a function of, for example, NFC communication. Further, when the transmission device 200 transmits allocation elevator information through an e-mail such as SMS or MMS, the smartphone may have a function that receives the e-mail such as SMS or MMS. Further, when the transmission device 200 transmits the allocation elevator information through a dedicated application installed on a smartphone, the dedicated application may be installed on a user's smartphone.

2. Operation 2-1. Outline 2-1-1. Open/Close Control of Gate Flapper of Security Turnstile An open/close control of the gate flapper 28 of the security turnstile 20 will be described in time series. When the user enters the security turnstile 20 (20A to 20C) with an ID card or a smartphone in which an authorized user ID is registered touching with or approaching the card reader 25, the card reader 25 reads the user ID from the ID card or the smartphone, and the card reader 25 transmits ID information (the user ID, the device ID) to the security server 100. When the user ID included in the received ID information is authorized, the security server 100 transmits a gate OPEN signal to the controller 21 of the security turnstile 20 related to the device ID. In this case, the controller 21 maintains the gate flapper 28 in the open state. As a result, the user can pass through the security turnstile 20.

On the other hand, when the user ID included in the received ID information is not authorized, the security server 100 transmits a gate CLOSE signal to the controller 21 of the security turnstile 20 with the received device ID. In this case, the controller 21 makes the gate flapper 28 in the close state. Thus, the user who presents the ID card or the smartphone with unauthorized user ID cannot pass through the security turnstile 20.

Further, when the controller 21 of the security turnstile 20 does not receive the gate OPEN signal from the security server 100 but receives a signal from the first sensor 26, the controller 21 controls the gate flapper 28 into the close state. This is because an unauthorized user who does not have an ID card or a smartphone with authorized user ID is prevented from passing through the security server 100.

In such a manner, the user who has the ID card or the smartphone with authorized user ID can enter an elevator hall, but an unauthorized user who does not have the ID card or the smartphone with authorized user ID cannot enter the elevator hall. Therefore, the security in the building is ensured.

2-1-2. Elevator Allocation Control

Elevator allocation control will be described in time series.

2-1-2-1. When ID Card or Smartphone is Presented to Security Turnstile or Card Reader of Destination Floor Registration Device When an ID card or a smartphone is presented to the security turnstile 20, or the card reader 25 or 36 of the destination floor registration device 30 and an obtained user ID is an authorized ID, the security server 100 determines whether or not it is smartphone authentication.

When the authentication is performed not via the smartphone but via the ID card, the security server 100 reads destination floor information and user attribution information related to the user ID from the user DB. The security server 100 transmits departure floor information, the destination floor information, the user attribution information, and a device ID of the security turnstile 20 or the destination floor registration device 30 as allocation request information to the group management control device 10.

On the other hand, when the authentication is performed via the smartphone, the security server 100 reads the destination floor information, the user attribution information, and the smartphone transmission destination information related to the user ID from the user DB. The security server 100 transmits the departure floor information, the destination floor information, the user attribution information, and the device ID of the security turnstile 20 or the destination floor registration device 30, and the smartphone transmission destination information as the allocation request information to the group management control device 10.

When the group management control device 10 receives the allocation request information (the departure floor information, the destination floor information, the user attribution information, the device ID, and the smartphone transmission destination information) including the smartphone transmission destination information, the group management control device 10 transmits, for example, guidance information for urging a confirmation of an allocation elevator through the smartphone, to the turnstile display 70 or the destination floor registration device 30 indicated by the received device ID, and decides an allocation elevator based on the allocation request information where an estimated movement time X (L) elapsed. The group management control device 10 transmits the allocation elevator information indicating the decided allocation elevator to the smartphone indicated by the smartphone transmission destination information via the transmission device 200.

On the other hand, when the group management control device 10 receives allocation request information (the departure floor information, the destination floor information, the user attribution information, and the device ID) that does not include the smartphone transmission destination information, the group management control device 10 decides an allocation elevator based on the received allocation request information. The group management control device 10 transmits allocation elevator information indicating the decided allocation elevator to the turnstile display 70 or the destination floor registration device 30 indicated by the device ID.

When receiving the allocation elevator information or the guidance information from the group management control device 10, the turnstile display 70 or the destination floor registration device 30 displays the received information.

2-1-2-2. When Destination Floor is Input Through Operating Elevator of Destination Floor Registration Device The elevator allocation control in the group management system in the case where the user specifies a destination floor via the destination floor registration device 30 will be described in time series.

When the destination floor is input to the operating unit 35, the destination floor registration device 30 transmits the destination floor information indicating the input destination floor, the departure floor information, and the device ID of the destination floor registration device 30 as the allocation request information to the group management control device 10. The destination floor registration device 30 stores the installation floor information of the self device, and uses the installation floor information of the self device stored as the departure floor information.

When receiving the allocation request information (the departure floor information, the destination floor information, and the device ID), the group management control device 10 decides an allocation elevator based on the destination floor information and the departure floor information included in the received allocation request information. The group management control device 10, then, transmits the allocation elevator information indicating the decided allocation elevator to the destination floor registration device 30 indicated by the device ID.

When receiving the allocation elevator information from the group management control device 10, the destination floor registration device 30 makes the display unit 34 display the allocation elevator information.

2-2. Concrete Operation 2-2-1. Concrete Operation of Security Server

Figure 13:
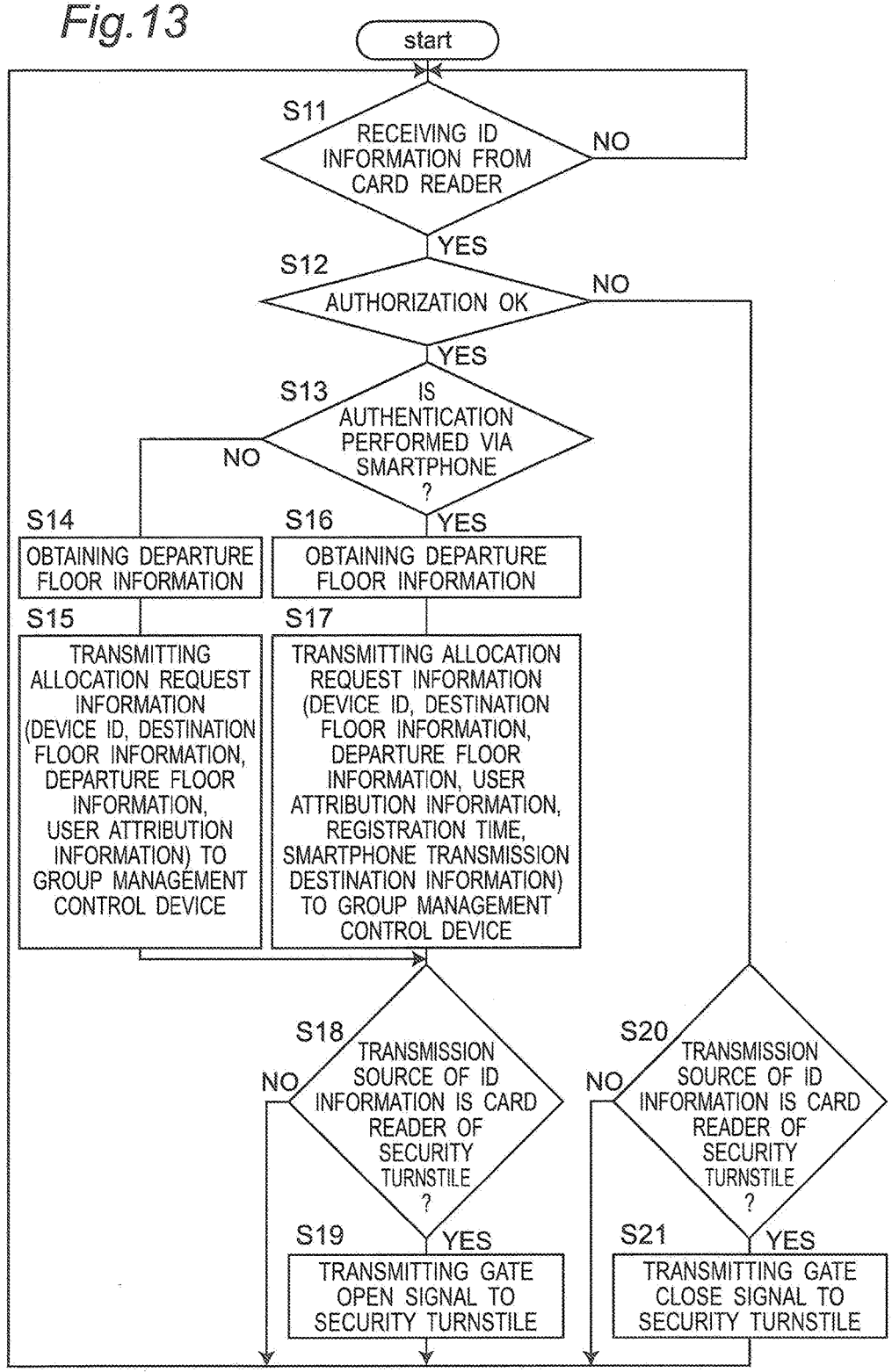
FIG. 13 is a flowchart illustrating an operation of the security server according to the first embodiment.

A concrete operation of the group management system will be described. A process to be executed by the security server 100 when the user passes through the security turnstile 20 will be first described. FIG. 13 is a flowchart illustrating an operation of the security server 100 according to the first embodiment.

The security server 100 (the controller 101) determines whether the ID information (the user ID and the device ID) is received from the card reader 25 of the security turnstile 20 in the card reader 25 of the security turnstile 20 and the card reader 36 of the destination floor registration device 30 (S11).

When not receiving the ID information (the user ID and the device ID) from the card reader 25 of the security turnstile 20 (NO at S11), the security server 100 (the controller 101) again make the determination at step S11.

When receiving the ID information (user ID, device ID) from the card reader 25 of the security turnstile 20 (YES at S11), the security server 100 determines (authenticates) whether a user TD included in the received ID information is authorized (S12). For example, the controller 101 of the security server 100 refers to the user DB stored in the storage unit 102, and determines whether the user ID included in the received ID information is registered in the user DB.

When the user ID is determined as authorized (YES at S12), namely, the authentication succeeds, the controller 101 of the security server 100 determines whether the smartphone is used for the authentication (S13). The controller 101 of the security server 100 determines whether the smartphone is used for the authentication based on, for example, whether a character string configuring the ID information includes a flag indicating the smartphone.

When the smartphone is not used for the authentication (NO at S13), the controller 101 of the security server 100 refers to the user DB stored in the storage unit 102 to obtain the destination floor information and the user attribution information related to the user ID. Further, the controller 101 of the security server 100 obtains the departure floor information related to the device ID included in the received ID information by referring to, for example, the installation floor information table (S14).

The controller 101 of the security server 100 transmits the obtained departure floor information, the destination floor information, the user attribution information, and the device ID included in the received ID information as the allocation request information to the group management control device 10 (S15).

When the smartphone is used for the authentication (YES at S13), the controller 101 of the security server 100 refers to the user DB stored in the storage unit 102 to obtain the destination floor information, the user attribution information, and the smartphone transmission destination information related to the user ID. Further, the controller 101 of the security server 100 refers to the installation floor information table to obtain the departure floor information related to the device ID included in the received ID information (S16).

The controller 101 of the security server 100 transmits the obtained departure floor information, destination floor information, user attribution information, and smartphone transmission destination information, and the device ID included in the received ID information as the allocation request information to the group management control device 10 (S17).

When the controller 101 of the security server 100 transmits the allocation request information (S15 or S17), the controller 101 determines whether a transmission source of the ID information is the card reader 25 of the security turnstile 20 or the card reader 36 of the destination floor registration device 30 (S18).

When the transmission source of the ID information is the card reader 25 of the security turnstile 20 (YES at S18), the controller 101 of the security server 100 transmits a gate OPEN signal to the security turnstile 20 (S19), and returns to step S11. When receiving the gate OPEN signal, the controller 21 of the security turnstile 20 controls the gate flapper 28 into the open state to enable the user to pass through the security turnstile 20.

When the transmission source of the ID information is not the card reader 25 of the security turnstile 20 (NO at S18), namely, is the card reader 36 of the destination floor registration device 30, the controller 101 of the security server 100 returns to step S11.

On the other hand, when the determination is made at step S12 that the user ID is not authorized (NO at S12), namely, the authentication is not approved of, the controller 101 of the security server 100 determines whether the transmission source of the ID information is the card reader 25 of the security turnstile 20 or the card reader 36 of the destination floor registration device 30 (S20).

When the transmission source of the ID information is the card reader 25 of the security turnstile 20 (YES at S20), the controller 101 of the security server 100 transmits a gate CLOSE signal to the security turnstile 20 (S21), and returns to step S11. When receiving the gate CLOSE signal, the controller 21 of the security turnstile 20 controls the gate flapper 28 into the close state not to enable the user to pass through the security turnstile 20.

When the transmission source of the ID information is not the card reader 25 of the security turnstile 20 (NO at S20), namely, the card reader 36 of the destination floor registration device 30, the controller 101 of the security server 100 returns to step S11.

2-2-2. Concrete Operation of Destination Floor Registration Device

Figure 14:
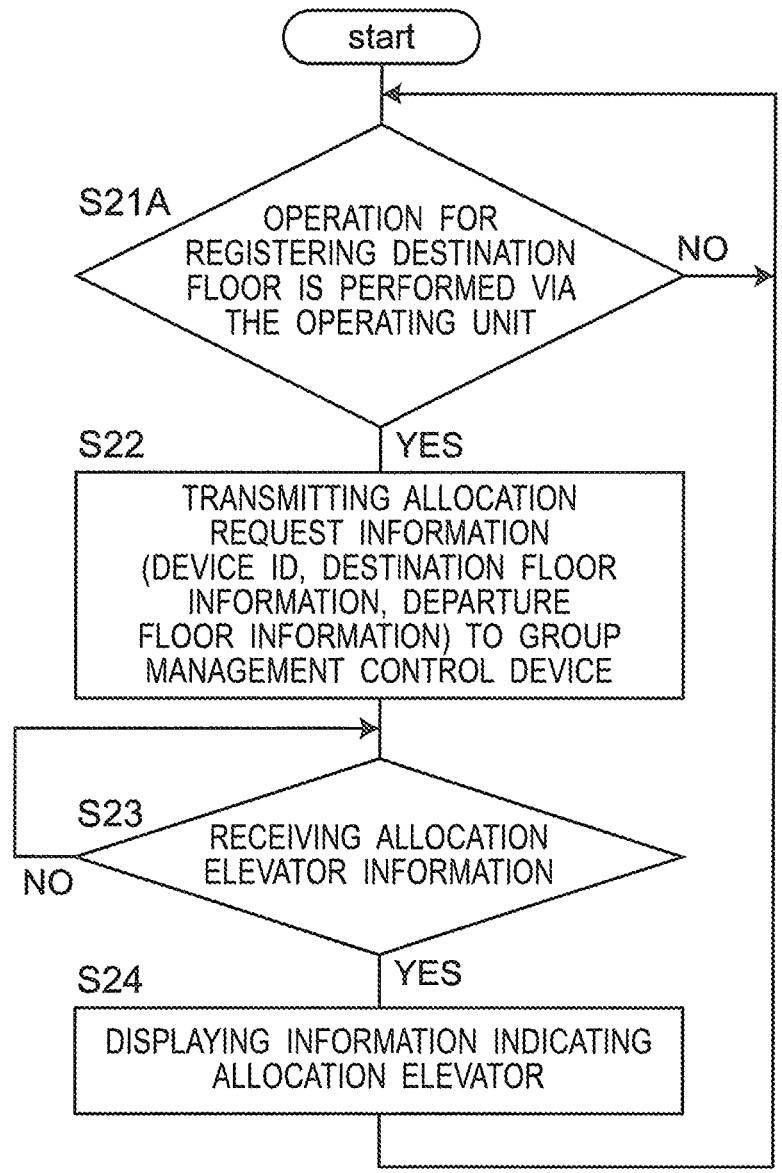
FIG. 14 is a flowchart illustrating an operation of the destination floor registration device according to the first embodiment.

An operation of the destination floor registration device 30 for registering a destination floor using the operating unit 35 of the destination floor registration device 30 will be described. FIG. 14 is a flowchart illustrating the operation of the destination floor registration device 30 according to the first embodiment.

The controller 31 of the destination floor registration device 30 determines whether the operation for registering a destination floor is performed via the operating unit 35 (S21A). For example, the determination is made whether an operation for inputting a destination floor via the operating unit 35 and deciding the input destination floor is performed.

When the determination is made that the operation for registering a destination floor is not performed via the operating unit 35 (NO at S21A), the controller 31 of the destination floor registration device 30 again makes the determination at step S21A. When the determination is made that the operation for registering a destination floor is performed via the operating unit 35 (YES at S21A), the controller 31 transmits the input destination floor information and departure floor information, and the device ID of the destination floor registration device 30 as the allocation request information to the group management control device 10 (S22). As the departure floor information, information indicating an installation floor of the self destination floor registration device 30 is used.

The controller 31 of the destination floor registration device 30 determines whether the controller 31 receives the allocation elevator information as a response to the allocation request information from the group management control device 10 (S23).

When the determination is made that the controller 31 does not receive the allocation elevator information (NO at S23), the controller 31 of the destination floor registration device 30 again makes the determination at step S23. When the determination is made that the controller 31 receives the allocation elevator information (YES at S23), the controller 31 makes the display unit 34 perform displaying information indicating the allocation elevator (524).

2-2-2. Concrete Operation of Group Management Control Device

Figure 15:
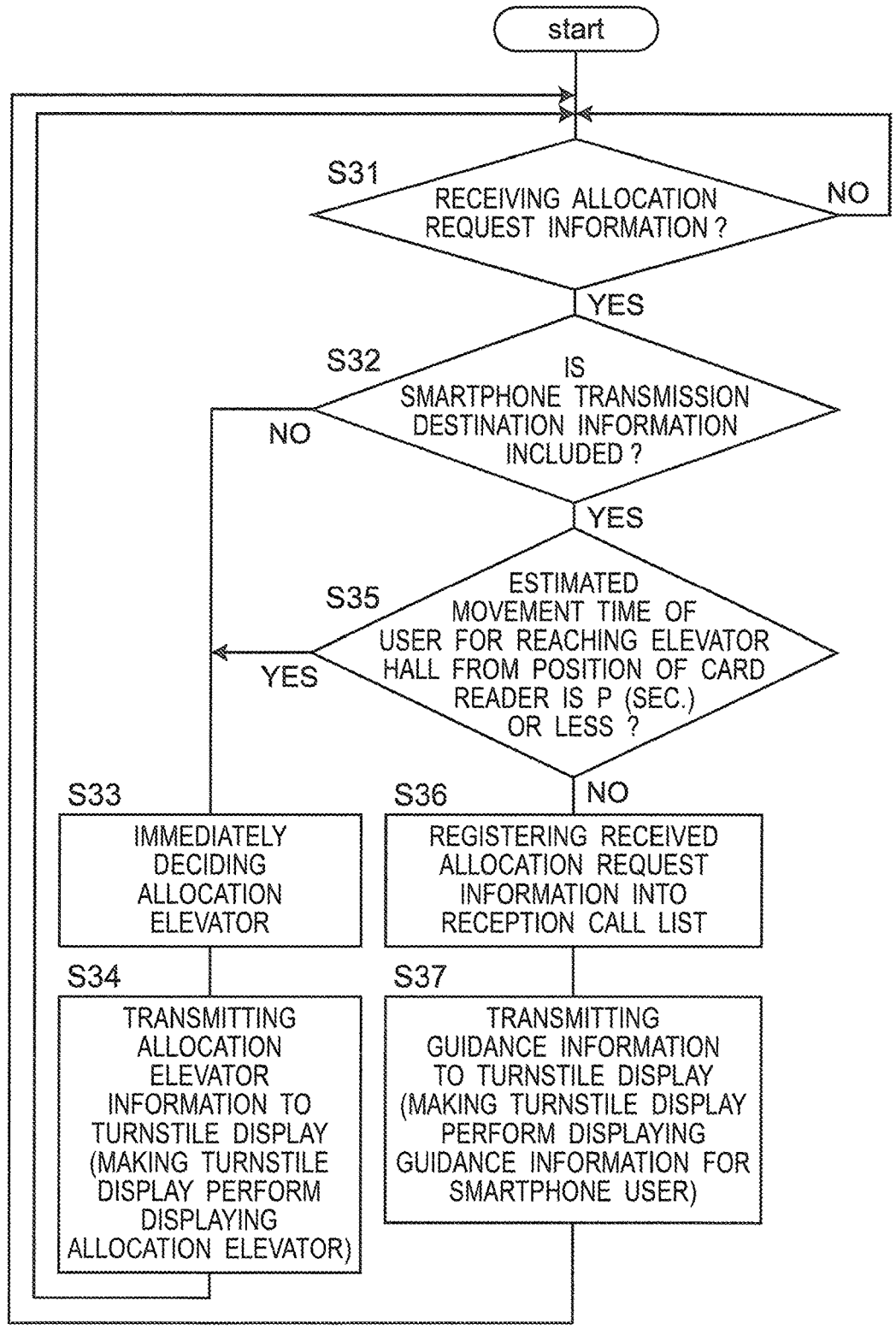
FIG. 15 is a flowchart illustrating an operation of the group management control device according to the first embodiment.

A process for deciding an allocation elevator in the group management control device 10 will be described. FIG. 15 is a flowchart illustrating an operation of the group management control device 10 according to the first embodiment.

The controller 11 of the group management control device 10 determines whether the controller 11 receives the allocation request information from the security server 100 or the destination floor registration device 30 (S31).

When not receiving the allocation request information (NO at S31), the controller 11 of the group management control device 10 again executes the process at step S31.

When receiving the allocation request information (YES at S31), the controller 11 of the group management control device 10 determines whether the smartphone transmission destination information is included in the allocation request information (S32).

When the determination is made that the smartphone transmission destination information is not included in the allocation request information (NO at S32), the controller 11 of the group management control device 10 immediately decides an allocation elevator (S33).

The decision of an allocation elevator will be performed as follows, for example. The controller 11 of the group management control device 10 first calculates an evaluation value for selecting an elevator (an allocation elevator) to which a destination floor related to a destination floor call should be allocated for each elevator based on operation information of each elevator. The operation information of each elevator includes, for example, information indicating a car state of each elevator (a car position, a travelling direction, a door open/close state, and a load), an estimated waiting time (an estimated time of a time passing until the allocation elevator arrives at a departure floor), an estimated time to destination (an estimated time of a time passing until the allocation elevator arrives at a destination floor), and an estimated number of car stopping times (an estimated number of elevator stopping times passing until the service is completed). After the calculation of the evaluation values, the group management control device 10 selects, for example, an elevator having the largest evaluation value from the elevators 60A to 60F to allocate the destination floor to the selected elevator. The group management control device 10 may allocate a destination floor to any elevator using another generally-known method other than this method.

When the allocation elevator is decided, the group management control device 10 transmits the allocation elevator information indicating the decided allocation elevator to the turnstile display 70 of the security turnstile 20 related to the received device ID or the destination floor registration device 30, makes the turnstile display 70 or the display unit 34 of the destination floor registration device 30 display the allocation elevator information (S34), and returns to step S31.

On the other hand, when the determination is made at step S32 that the smartphone transmission destination information is included in the allocation request information (YES at S32), the controller 11 of the group management control device 10 determines whether the estimated movement time X(L) of the user relating to the allocation request information is a predetermined movement time P (sec.) or less (S35). The estimated movement time X(L) is an estimated time of a moving time to be necessary for the user to reach the elevator hall from a position of the card reader 25 or 36 used by the user. The estimated movement time X(L) is set separately for able-bodied people and for wheel chair users in advance. One example of the estimated movement time X(L) will be described below.

FIG. 16 is a diagram illustrating a configuration of the estimated movement time table for able-bodied people stored in the storage unit 12 of the group management control device 10 according to the first embodiment. In this example, 15 sec., 14 sec., 15 sec., and 3 sec. are set as the estimated movement time X(L) for the card reader 25 or 36 with device IDs 1, 2, 3, and 4 according to a distance between the card reader 25 or 36 and the elevator hall. The card readers 36 with device IDs 1, 2, and 3 are card readers provided to the security turnstile 20 disposed on a position comparatively far from an elevator boarding place. The card reader 36 with device ID 4 is a card reader provided to the destination floor registration device 30 disposed near the elevator boarding place. For this reason, the estimated movement times X(L) relating to the card readers 36 with device IDs 1, 2, and 3 are longer than the estimated movement time X(L) relating to the card reader 36 with device ID 4.

FIG. 17 is a diagram illustrating a configuration of the estimated movement time table for wheelchair users stored in the storage unit 12 of the group management control device 10 according to the first embodiment. The estimated movement time X(L) for wheelchair users is set to a value larger than the estimated movement time X(L) for able-bodied people. For example, 30 sec., 28 sec., 30 sec., and 6 sec. are set as the estimated movement times X(L) for the card readers 25 or 36 with device IDs 1, 2, 3, and 4 according to a distance between the card readers 25 or 36 and the elevator hall.

With again reference to FIG. 15, when the determination is made that the estimated movement time X(L) is the predetermined movement time P (sec.) or less (YES at S35), the controller 11 of the group management control device 10 decides an allocation elevator at steps S33 and S34 to transmit the allocation elevator information to the turnstile display 70.

When the determination is made that the estimated movement time X(L) is not the predetermined movement time P (sec.) or less (NO at S35), the controller 11 of the group management control device 10 relates the received allocation request information (the departure floor information, the destination floor information, the user attribution information, the device ID, and the smartphone transmission destination information) to a current time to register the information into a reception call list (S36). The reception call list functions as a buffer that stores allocation request information of a call determined as NO at step S35, namely a call where the estimated movement time X(L) is not the predetermined movement time P (sec.) or less until allocation of an elevator related to the call is completed. A concrete example will be described later. The allocation of an elevator related to the call is performed not immediately but when the estimated movement time X(L) mostly passes. Details of the allocating process will be described later.

When the above information is registered in the reception call list, the group management control device 10 transmits the guidance information shown in FIG. 10B to the turnstile display 70 of the security turnstile 20 related to the received device ID or the destination floor registration device 30 (S37), and returns to step S31. As a result, the turnstile display 70 of the security turnstile 20 or the display unit 34 of the destination floor registration device 30 display the guidance information shown in FIG. 10R. The process at step S37 does not have to be provided. In this case, the turnstile display 70 of the security turnstile 20 or the display unit 34 of the destination floor registration device 30 displays nothing.

Figure 18:
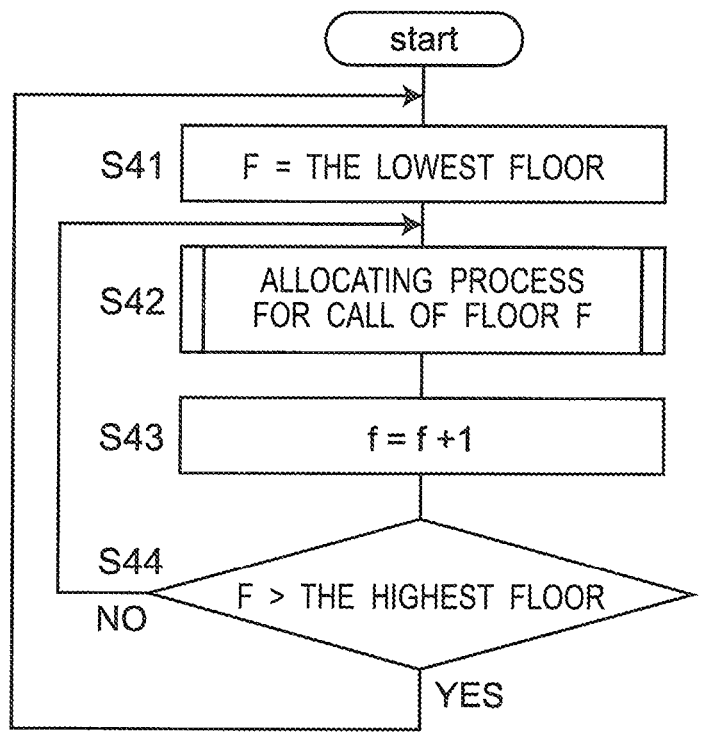
FIG. 18 is a flowchart illustrating an outline of an allocating operation for an elevator according to a call (allocation request information) registered in a reception call list in the group management control device according to the first embodiment.

The elevator allocating process to be executed by the group management control device 10 for the allocation request information (call) registered in the reception call list will be described below. FIG. 18 is a flowchart illustrating an outline of the allocating operation on elevators according to the calls (the allocation request information) registered in the reception call list in the group management control device 10 according to the first embodiment. A process based on the flowchart in FIG. 18 (FIG. 19) is executed in parallel with the process in the group management control device 10 according to the flowchart in FIG. 15.

As shown in FIG. 18, the controller 11 of the group management control device 10 sets the lowest floor of the building as a calculation target floor f (S41).

The controller 11 of the group management control device 10 executes the elevator allocating process according to a call such that the calculation target floor f is a departure floor (S42). Concrete contents of the allocating process will be described later.

When the elevator allocating process for the calculation target floor f is completed, the controller 11 of the group management control device 10 adds 1 to the calculation target floor f (S43).

The controller 11 of the group management control device 10 determines whether the value of the calculation target floor f is larger than a value of the highest floor of the building (S44).

When the value of the calculation target floor f is not larger than the value of the highest floor of the building (NO at S44), the controller 11 of the group management control device 10 executes the allocating process at step S42 on the calculation target floor f. On the other hand, when the value of the calculation target floor f is larger than the value of the highest floor of the building (YES at S44), the controller 11 of the group management control device 10 returns to step S41, sets the calculation target floor f to the lowest floor of the building, and repeats the process thereafter.

The elevator allocating process on the call registered in the reception call list at step S42 (the allocation request information) will be described in detail below. FIG. 19 is a flowchart illustrating details of the allocating operation on the elevator related to the call (the allocation request information) registered in the reception call list in the group management control device 10 according to the first embodiment. FIG. 20 is a diagram illustrating one example of a configuration of the reception call list stored in the storage unit 12 of the group management control device 10. The configuration of the reception call list will be first described with reference to FIG. 20.

The allocation request information of the call determined as NO at step S35 is registered in the reception call list. Such a call is registered by using a smartphone, and the estimated movement time X(L) is longer than P sec. and the allocation is put off in this call. As shown in FIG. 20, in the reception call list, the allocation request information of each call includes a registration time, departure floor information, destination floor information, user attribution information, a device ID, and smartphone transmission destination information. In the example of FIG. 20, seven pieces of allocation request information is registered. In the allocation request information of the oldest call, "8:00:01.5", a 1st floor, a 5th floor, able-bodied people, 1, and A1 are registered as the registration time, the departure floor information, the destination floor information, the user attribution information, the device ID, and the smartphone transmission destination information, respectively. Further, in the allocation request information of a second oldest call, "8:00:01.7", 1st floor, 7th floor, able-bodied person, 2, and A2 are registered as the registration time, the departure floor information, the destination floor information, the user attribution information, the device ID, and the smartphone transmission destination information, respectively. Further, in the allocation request information of a third oldest call, "8:00:02.1", 1st floor, 10th floor, able-bodied person, 1, and A3 are registered as the registration time, the departure floor information, the destination floor information, the user attribution information, the device ID, and the smartphone transmission destination information, respectively. Similar contents are registered as the remaining allocation request information, and description thereof is omitted.

Details of the elevator allocating operation for the call registered in the reception call list (the allocation request information) will be described with reference to the flowchart in FIG. 19.

The controller 11 of the group management control device 10 determines whether the allocation request information registered in the reception call list includes the allocation request information in which the departure floor is the calculation target floor f (S51).

When the allocation request information where the departure floor is the calculation target floor f is not present (No at S51), the controller 11 of the group management control device 10 ends the process according to the flowchart, and executes the process at step S43 in the flowchart of FIG. 18.

When the allocation request information where the departure floor is the calculation target floor f is present (Yes at S51), the controller 11 of the group management control device 10 determines whether allocation request information where the estimated movement time X(L) elapsed from the registration time is present among the allocation request information where the departure floor is the calculation target floor f (S52). This determination is made based on whether, for example, a value obtained by adding the estimated movement time X(L) to the registration time of each allocation request information is later than a current time.

When the allocation request information after the elapse of the estimated movement time X (L) from the registration time is not present (No at S52), the controller 11 of the group management control device 10 ends the process according to the flowchart to execute the process at step S43 in the flowchart of FIG. 18.

When the allocation request information after the elapse of the estimated movement time X(L) from the registration time is present (Yes at S52), the controller 11 of the group management control device 10 stores a destination floor d relating to the allocation request information where the estimated movement time X(L) elapsed from the registration time (S53).

The controller 11 of the group management control device 10 extracts the allocation request information where the departure floor is the calculation target floor f and the destination floor is the destination floor d from the allocation request information registered in the reception call list (S54). That is to say, the controller 11 extracts the allocation request information after the elapse of the estimated movement time X(L) from the registration time, and the allocation request information where the departure floor and the destination floor are the same. At this time, the controller 11 also extracts the allocation request information after the elapse of the estimated movement time X(L) from the registration time at step S52.

The controller 11 of the group management control device 10 registers the extracted allocation request information in an allocation call list (S55).

The controller 11 of the group management control device 10 obtains one piece of allocation request information from the allocation request information registered in the allocation call list (S56). The controller 11 of the group management control device 10 obtains, for example, the allocation request information whose registration time is the oldest.

The controller 11 of the group management control device 10 decides an optimum allocation elevator for a call related to the extracted allocation request information (S57). The optimum allocation elevator is determined by a method similar to the method at step S33.

The controller 11 of the group management control device 10 generates information indicating the decided allocation elevator, and transmits the generated information to a smartphone indicated by the smartphone transmission destination information included in the allocation request information obtained at step S56 via the transmission device 200 (S58).

The controller 11 of the group management control device 10 deletes the allocation request information obtained at step S56 from the allocation call list and the reception call list (S59).

The controller 11 of the group management control device 10 determines whether the allocation of the elevators to the calls relating to all pieces of the allocation request information registered in the allocation call list is completed (S60). For example, the group management control device 10 determines whether the allocation of the elevators is completed based on whether the allocation request information remains in the allocation call list.

When the determination is made that the allocation of the elevators to the calls of all the allocation request information registered in the allocation call list is not completed (No at S60), the controller 11 of the group management control device 10 executes the process after step S56 on the calls of the remaining allocation request information.

When the determination is made that the allocation of the elevators to the calls relating to all the allocation request information registered in the allocation call list is completed (Yes at S60), the controller 11 of the group management control device 10 ends the process in this flowchart to execute the process at step S43 in the flowchart of FIG. 18.

2-2-3. Concrete Example of Allocating Process According to Reception Call List and Allocation Call List A concrete example of the elevator allocating process according to the flowchart in FIG. 19 will be described with reference to FIG. 20 to FIG. 23. FIG. 20 to FIG. 23 are diagrams illustrating examples of the reception call list and the allocation call list.

As the calculation target floor f, it is supposed that list floor is first set at step S41 in FIG. 18. In the reception call list shown in FIG. 20, a call that the departure floor is 1st floor of the calculation target floor f is present. Further, the allocation request information where the registration time is 8:00:01.5 is present as the call after the elapse of the estimated movement time X (L) from the registration time. At this time, the group management control device 10 sets 5th floor of the destination floor relating to the allocation request information as an extraction target destination floor d (S53). Allocation request information where 1st floor of the calculation target floor f is the departure floor and 5th floor of the extraction target destination floor d is the destination floor is extracted from the reception call list in FIG. 20 (S54), and is registered in the allocation call list (S55). FIG. 21 illustrates the allocation call list at this time. As shown in FIG. 21, the allocation request information where the registration time is 8:00:01.5, and the allocation request information where the registration time is 8:00:05.2 are registered in the allocation call list. The departure floor and the destination floor of the allocation request information where the registration time is 8:00:02.1 are the same as the departure floor and the destination floor of the allocation request information where the registration time is 8:00:01.5, namely, 1st floor and 5th floor.

The group management control device 10 obtains allocation request information where earlier registration time is 8:00:01.5 from the allocation request information registered in the allocation call list in FIG. 21 (S56), and decides an optimum allocation elevator relating to the taken call (S57). The group management control device 10, then, generates information of the decided allocation elevator, and transmits the generated information to a smartphone indicated by the smartphone transmission destination information via the transmission device 200 (S58). The group management control device 10 deletes the allocation request information from the reception call list and the allocation call list (S59). FIG. 22 illustrates the allocation call list at this time. As shown in FIG. 21, only the allocation request information where the registration time is 8:00:05.2 is registered in the allocation call list.

Since the allocation request information where the registration time is 8:00:05.2 remains in the allocation call list (No at S60), the group management control device 10 decides the allocation elevator similarly for the allocation request information (S57), generates information indicating the decided allocation elevator. The group management control device 10, then, transmits the generated information to a smartphone indicated by the smartphone transmission destination information via the transmission device 200 (S58), and deletes the allocation request information from the reception call list and the allocation call list (S59). At this time, no allocation request information is registered in the allocation call list, and the allocation request information where the registration time when the allocation is completed is 8:00:01.5, and the allocation request information where the registration time is 8:00:05.2 are deleted in the reception call list as shown in FIG. 22.

Since no allocation request information remains in the allocation call list (Yes at S60), the group management control device 10 executes the similar process on a next calculation target floor f. Further, when the above process is completed on all the calculation target floors f (Yes at S44), the calculation target floor f is set to the lowest floor, and repeats the above process.

When allocation is performed on the call relating to the allocation request information where the registration time is 8:00:01.5 and the call relating to the allocation request information where the registration time is 8:00:05.2 by a normal immediate allocating method, a difference between the registration times of these calls is a little less than four seconds. For this reason, a call that is generated during a little less than four seconds might be allocated to the same elevator to which the first call relating to the allocation request information where the registration time is 8:00:01.5 is allocated. As a result, the call relating to the allocation request information whose registration time is 8:00:01.5, and the call relating to the allocation request information whose registration time is 8:00:05.2 might be allocated to different elevators although the departure floor and the destination floor are the same between these calls. For this reason, this method has a problem from a viewpoint of operation efficiency of the elevators. However, according to this embodiment, when the allocation is put off during the estimated movement time X(L), and the allocating process is executed sequentially on the calls that the departure floor and the destination floor are the same between the calls. As a result, when the operating states and the allocating states are approximately the same between the calls, optimum allocation elevators are decided for these calls. Thus, a potential of allocating the same elevator to these calls increases. As described above, the allocation is put off by effectively using the movement time of a user, so that the operating efficiency of elevators can be improved. In a conventional manner, particularly during busy hours, when new users sequentially perform registration, different elevators are occasionally allocated to users who have the same departure floor and the same destination floor. According to this embodiment, however, the allocating process is sequentially executed for a very short time on the calls with the same departure floor and the same destination floor, so that the same elevator is easily allocated to the calls with the same departure floor and the same destination floor even during busy hours. Therefore, a number of stops of elevators during busy hours decreases, and thus the operating efficiency can be greatly improved. According to this embodiment, even in a situation that both users having ID cards and users having smartphones are present, the operating efficiency of elevators are improved, so that an appropriate service can be provided.

Outline of Embodiment (1) The group management control device 10 of elevator according to the first embodiment allocates a call relating to allocation request information specifying a departure floor and a destination floor to any elevator of a plurality of elevators 60. The allocation request information is generated by the security server 100 (the allocation request generating device) based on a user ID (user information) obtained by the card reader 25 or 36 (the information obtaining device) disposed on or near the route to a boarding place.

The card reader 25 or 36 (the information obtaining device) is configured to be capable of obtaining a user ID (user information) from a smartphone (an information communication terminal) of a user.

The security server 100 (the allocation request generating device) is configured to transmit the allocation request information to the group management control device 10 in a form that a determination can be made whether the user ID (the user information) is obtained from the smartphone (the information communication terminal) when the card reader 25 or 36 (the information obtaining device) obtains the user ID (the user information).

The group management control device 10 includes the storage unit 12, and the controller 11 that decides an allocation elevator to which the call relating to the allocation request information received from the security server 100 (the allocation request generating device) is allocated.

When the received allocation request information does not indicate that the user ID (the user information) is obtained from the smartphone (the information communication terminal), the controller 11 immediately decides the allocation elevator to which the call relating to the allocation request information is allocated, and makes the turnstile display 70 (the notification device) disposed near the card reader 25 or 36 (the information obtaining device) or the display unit 34 (the notification device) of the destination floor registration device 30 display (notify of) the information indicating the decided allocation elevator. When the received allocation request information indicates that the user ID (the user information) is obtained from the smartphone (the information communication terminal), the controller 11 makes the storage unit 12 store the allocation request information, and after elapse of the estimated movement time X(L) (predetermined time) from the reception of the allocation request information, reads the allocation request information to decide the allocation elevator to which the call relating to the allocation request information is to be allocated. The controller 11 transmits information indicating the decided allocation elevator to the smartphone (the information communication terminal) via the transmission device 200 (the predetermined radio communication device).

With this configuration, in a situation that both users having ID cards and users having smartphones (the information communication terminals) are present, an optimum service can be provided.

(2) In the group management control device 10 of elevator according to the first embodiment, in the decision of the allocation elevator to which the call relating to allocation request information where the estimated movement time X(L) (the predetermined time) is elapsed from the reception is allocated, when allocation request information having the same departure floor and the same destination floor as the allocation request information after the elapse of the estimated movement time X(L) (the predetermined time) is present in the allocation request information stored in the storage unit 12, the controller 11 decides also the allocation elevator to which a call relating to the allocation request information having the same departure floor and the same destination floor is allocated.

With this configuration, the allocation elevator is decided approximately simultaneously for the call relating to the allocation request information after the elapse of the estimated movement time X(L) (the predetermined time), and a call having the same departure floor and the same destination floor as the former call. Thus, a potential of allocating the same elevator to these calls increases. Therefore, the operating efficiency of the elevator 60 can be improved.

(3) In the group management control device 10 of elevator according to the first embodiment, the estimated movement time X(L) (the predetermined time) is an estimated movement time of a user, the estimated movement time being set based on a distance between the card reader 25 or 36 (the information obtaining device) and the boarding place.

With this configuration, during the estimated movement time X(L) of the user, the allocation of an elevator can be put off. In other words, an optimum elevator can be allocated by effectively using the movement time of a user, so that the operating efficiency of elevator 60 can be improved.

(4) In the group management control device 10 of elevator according to the first embodiment, the plurality of card readers 25 or 36 (the information obtaining devices) is provided on positions whose distances to the boarding place are different from each other.

The estimated movement time X(L) (the predetermined time) is set correspondingly to each of the card readers 25 or 36 (the information obtaining devices).

With this configuration, the estimated movement time X(L) (the predetermined time) is set according to the distance from the card reader 25 or 36 (the information obtaining device) used by a user to the boarding place. For this reason, an optimum elevator can be allocated by effectively using the movement time of a user according to the distance to the boarding place, so that the operating efficiency of elevator 60 can be improved.

(5) In the group management control device 10 of elevator according to the first embodiment, even when receiving allocation request information, which indicates that the user ID (the user information) is obtained from a smartphone (an information communication terminal), from the card reader 25 or 36 (the information obtaining device), the controller 11 immediately decides an elevator to which the call relating to the allocation request information is to be allocated, and transmits information indicating the decided allocation elevator to the smartphone (the information communication terminal) via the transmission device 200 (the predetermined radio communication device) when the estimated movement time X(L) (the predetermined time) is shorter than the predetermined movement time P.

With this configuration, for example, when the distance to the boarding place is so short that the user cannot have a sufficient time to check the allocation elevator with the smartphone (the information communication terminal) by the user reaches the boarding place, the user can be made to recognize the allocation elevator via the turnstile display 70 (the notification device) or the display unit 34 (the notification device) of the destination floor registration device 30 disposed near the card reader 25 or 36 (information obtaining device).

(6) In the group management control device 10 of elevator according to the first embodiment, the security server 100 (allocation request generating device) transmits the allocation request information to the controller 11 of the group management control device 10, the allocation request information including attribution information indicating attribution of the user related to the user ID (the user information) obtained by the card reader 25 or 36 (information obtaining device).

The estimated movement time X(L) (the predetermined time) is set according to the attribution information of a user.

With this configuration, the estimated movement time X(L) (the predetermined time) according to the attribution of the user is set. Thus, an optimum elevator can be allocated by effectively using the movement time according to the attribution of a user, so that the operating efficiency of elevator 60 can be improved.

(7) In the group management control device 10 of elevator according to the first embodiment, when the received allocation request information indicates that the user ID (the user information) is obtained from the smartphone (the information communication terminal), the controller 11 makes the turnstile display 70 (the notification device) or the display unit 34 (the notification device) of the destination floor registration device 30 disposed near the card reader 25 or 36 (the information obtaining device) display (notifies of) information for urging a check of the allocation elevator via the smartphone (the information communication terminal).

With this configuration, even when the smartphone (the information communication terminal) is used, the turnstile display 70 (the notification device) or the display unit 34 (the notification device) of the destination floor registration device 30 displays the information for urging a check of the allocation elevator via the smartphone (the information communication terminal). For this reason, it does not occur to make the user to feel anxious that the turnstile display 70 (the notification device) or the display unit 34 (the notification device) of the destination floor registration device 30 displays nothing.

(8) The elevator group management system according to the first embodiment includes the card reader 25 or 36 (information obtaining device) that is disposed on or near the route to the boarding place, the security server 100 (allocation request generating device) that generates allocation request information specifying a departure floor and a destination floor based on the user ID (the user information) obtained by the card reader 25 or 36 (information obtaining device), and the group management control device 10 that allocates a call relating to the allocation request information generated by the security server 100 (the allocation request generating device) to any elevator of the plurality of elevators 60.

With this configuration, the above effect is obtained in the group management system of elevator having the card reader 25 or 36 (the information obtaining device), the security server 100 (allocation request generating device), and the group management control device 10.

(9) The elevator system according to the first embodiment includes the plurality of elevators 60, and the group management control device 10. The group management control device 10 allocates a call relating to allocation request information for specifying a departure floor and a destination floor to any elevator of a plurality of elevators 60. The allocation request information is generated by the security server 100 (the allocation request generating device) based on a user ID (user information) obtained by the card reader 25 or 36 (the information obtaining device) disposed on or near the route to the boarding place.

With this configuration, the above effect can be obtained in the elevator system having the plurality of elevators 60, and the group management control device 10.

(10) The elevator system according to the first embodiment includes the plurality of elevators 60, the card reader 25 or 36 (the information obtaining device) that is disposed on or near the route to the boarding place, the security server 100 (the allocation request generating device) that generates allocation request information specifying a departure floor and a destination floor based on the user ID (the user information) obtained by the card reader 25 or 36 (the information obtaining device), and the group management control device 10 that allocates a call relating to the allocation request information generated by the security server 100 (the allocation request generating device) to any elevator of the plurality of elevators 60.

With this configuration, the above effect is obtained in the elevator system having the plurality of elevators 60, the card reader 25 or 36 (the information obtaining device), the security server 100 (the allocation request generating device), and the group management control device 10.

Another Embodiment

The embodiment has exemplified the card readers 25 and 36 as the information obtaining device of the present invention. However, the information obtaining device as means for reading user information from a device other than the information communication terminal may be a fingerprint reading device that can read fingerprints or a face recognition device that can recognize faces.

The above embodiment has exemplified the smartphone as the information communication terminal of the present invention. However, the information communication terminal may be a tablet terminal, a mobile telephone terminal, or a portable computer as long as ID information can be read from such a terminal and such a terminal can receive allocation elevator information.

The above embodiment has exemplified the turnstile display 70 and the display unit 34 of the destination floor registration device 30 that display information indicating an allocation elevator or guidance information as a notification unit that notifies of the information indicating an allocation elevator of the present invention or the guidance information. However, the notification unit may be a voice output unit that notifies of the information indicating an allocation elevator or the guidance information through a voice. In another manner, the notification unit may be configured by both the above display member and the voice output unit that notifies of the information indicating an allocation elevator or the guidance information through a voice.

The above embodiment has exemplified two types of user attributes of able-bodied people and wheelchair users. However, the user attributes are not limited to the two types of the attributes, and may be three or more types of attributes, and accordingly entries may be added to an estimated movement time table. For example, VIP (Very Important Person) is added as the user attribute, and accordingly an estimated movement time for VIP may be added to the estimated movement time table. In a case of VIP, the estimated movement time may be set to be longer than the estimated movement time for able-bodied people. Further, classification of the user attribution may employ any classification other than the above one.

In the above embodiment, the controllers 11, 21, 31, 41, 71, and 101 are configured by CPU or MPU, and execute the calculating process using various data based on the programs read from the storage units 12, 22, 32, 42, 72, and 102 to realize various functions. That is to say, the controllers 11, 21, 31, 41, 71, and 101 are realized by cooperation of hardware and software. However, each of the controllers 11, 21, 31, 41, 71, and 101 may be configured by, for example, only hardware (an electronic circuit), FPGA, or ASIC.

In the above embodiment, the network NW is Ethernet (registered trademark), and each of the input/output interfaces 13, 23, 24, 33, 43, 73, and 103 is configured by an LAN adaptor. However, the network NW may be, for example, wireless LAN that meets the IEEE standards, and each of the input/output interfaces 13, 23, 24, 33, 43, 73, and 103 may be configured by a wireless LAN adaptor.

In the above embodiment, the card reader 25 is connected to the input/output interface 23. However, the card reader 25 may be connected to the controller 21. In this case, the user ID read by the card reader 25 may be transmitted to the security server 100 via the controller 21 and the input/output interface 23. Further, a device ID for the security turnstile 20 where the card reader 25 is installed may be transmitted not from the card reader 25 but from the controller 21 to the security server 100.

In the above embodiment, the card reader 36 is connected to the second input/output interface 37. However, the card reader 36 may be connected to the controller 31. In this case, the user ID read by the card reader 36 may be transmitted to the security server 100 via the controller 31 and the second input/output interface 37. Further, a device ID for the destination floor registration device 30 where the card reader 36 is installed may be transmitted not from the card reader 36 but from the controller 31 to the security server 100.

What is claimed is:

1. A group management control device for a plurality of elevators, the group management control device allocating a call relating to allocation request information, which is generated by an allocation request generating device based on user information obtained by a card reader provided on a security turnstile disposed on a route to a boarding place,
the card reader being configured to be capable of obtaining user information from an information communication terminal and an identification card (ID card) held by a user,
the allocation request generating device being configured:
to transmit destination allocation request information that includes transmission destination information of the information communication terminal, to the group management control device, when the card reader obtains the user information from the information communication terminal, and
to transmit non-destination allocation request information that does not include the transmission destination information, to the group management control device, when the card reader obtains the user information from the ID card,
the group management control device comprising:
a storage unit; and
a controller that decides an allocation elevator to which a call relating to allocation request information received from the allocation request generating device is allocated, wherein
when the received allocation request information does not include the transmission destination information, the controller immediately decides the allocation elevator to which the call relating to the non-destination allocation request information is allocated, and makes a turnstile display disposed on the security turnstile display information indicating the decided allocation elevator,
when the received allocation request information includes the transmission destination information and an estimated movement time of the user relating to the destination allocation request information is a predetermined movement time or less, the estimated movement time being an estimated time necessary for the user to reach the boarding place from a position of the card reader used by the user, the controller immediately decides the allocation elevator to which the call relating to the destination allocation request information is allocated, and makes the turnstile display disposed on the security turnstile display information indicating the decided allocation elevator,
when the received allocation request information includes the transmission destination information and the estimated movement time is not the predetermined movement time or less, the controller:
makes the storage unit store the destination allocation request information,
makes the turnstile display disposed on the security turnstile display guidance information, the guidance information being information that urges the user to confirm the decided allocation elevator through the information communication terminal, and
thereafter, when an estimated movement time passes from a time of the reception of the destination allocation request information, reads the allocation request information from the storage unit to decide the allocation elevator to which the call relating to the destination allocation request information is to be allocated and transmits information indicating the decided allocation elevator to the information communication terminal via a predetermined radio communication device.

2. The group management control device according to claim 1, wherein in the decision of the allocation elevator to which the call relating to the destination allocation request information after the elapse of the estimated movement time from the reception is allocated, when allocation request information having the same departure floor and the same destination floor as the destination allocation request information after the elapse of the estimated movement time is present in the allocation request information stored in the storage unit, the controller decides also the allocation elevator to which a call relating to the allocation request information having the same departure floor and the same destination floor is allocated.

3. The group management control device according to claim 1, wherein the estimated movement time is set based on a distance from the card reader to the boarding place.

4. The group management control device according to claim 3, wherein
a plurality of card readers is provided to positions whose distances to the boarding place are different from each other,
the estimated movement time is set correspondingly to each of the card readers.

5. The group management control device according to claim 1, wherein
the destination allocation request information includes attribution information indicating attribution of the user related to the user information obtained by the card reader,
the estimated movement time is set according to the attribution information of the user.

6. A group management system for a plurality of elevators comprising:
a card reader provided on a security turnstile disposed on a route to a boarding place;
an allocation request generating device that generates allocation request information based on user information obtained by the card reader; and
a group management control device that allocates a call relating to allocation request information which is generated by the allocation request generating device to any elevator in a plurality of elevators, wherein
the card reader is configured to be capable of obtaining user information from an information communication terminal and an ID card held by a user,
the allocation request generating device is configured:
to transmit destination allocation request information that includes transmission destination information of the information communication terminal, to the group management control device, when the card reader obtains the user information from the information communication terminal, to transmit non-destination allocation request information that does not include the transmission destination information, to the group management control device, when the card reader obtains the user information from the ID card, the group management control device includes a storage unit and a controller that decides an allocation elevator to which a call relating to allocation request information received from the allocation request generating device is allocated, wherein when the received allocation request information does not include the transmission destination information, the controller immediately decides the allocation elevator to which the call relating to the non-destination allocation request information is allocated, and makes a turnstile display disposed on the security turnstile display information indicating the decided allocation elevator, when the received allocation request information includes the transmission destination information and an estimated movement time of the user relating to the destination allocation request information is a predetermined movement time or less, the estimated movement time being an estimated time necessary for the user to reach the boarding place from a position of the card reader used by the user, the controller immediately decides the allocation elevator to which the call relating to the destination allocation request information is allocated, and makes the turnstile display disposed on the security turnstile display information indicating the decided allocation elevator, when the received allocation request information includes the transmission destination information and the estimated movement time is not the predetermined movement time or less, the controller:

makes the storage unit store the destination allocation request information, makes the turnstile display disposed on the security turnstile display guidance information, the guidance information being information that urges the user to confirm the decided allocation elevator through the information communication terminal, and thereafter, when an estimated movement time passes from a time of the reception of the destination allocation request information, reads the allocation request information from the storage unit to decide the allocation elevator to which the call relating to the destination allocation request information is to be allocated, and transmits information indicating the decided allocation elevator to the information communication terminal via a predetermined radio communication device.

7. An elevator system comprising:

a plurality of elevators; and a group management control device that allocates a call relating to allocation request information, which is generated by an allocation request generating device based on user information obtained by a card reader provided on a security turnstile disposed on a route to a boarding place, wherein the card reader is configured to be capable of obtaining user information from an information communication terminal and an ID card held by a user, the allocation request generating device is configured:

to transmit destination allocation request information that includes transmission destination information of the information communication terminal, to the group management control device, when the card reader obtains the user information from the information communication terminal, to transmit non-destination allocation request information that does not include the transmission destination information, to the group management control device, when the card reader obtains the user information from the ID card, the group management control device includes a storage unit and a controller that decides an allocation elevator to which a call relating to allocation request information received from the allocation request generating device is allocated, wherein when the received allocation request information does not include the transmission destination information, the controller immediately decides the allocation elevator to which the call relating to the non-destination allocation request information is allocated, and makes a turnstile display disposed on the security turnstile display information indicating the decided allocation elevator, when the received allocation request information includes the transmission destination information and an estimated movement time of the user relating to the destination allocation request information is a predetermined movement time or less, the estimated movement time being an estimated time necessary for the user to reach the boarding place from a position of the card reader used by the user, the controller immediately decides the allocation elevator to which the call relating to the destination allocation request information is allocated, and makes the turnstile display disposed on the security turnstile display information indicating the decided allocation elevator, when the received allocation request information includes the transmission destination information and and the estimated movement time is not the predetermined movement time or less, the controller:

makes the storage unit store destination the allocation request information, makes the turnstile display disposed on the security turnstile display guidance information, the guidance information being information that urges the user to confirm the decided allocation elevator through the information communication terminal, and thereafter, when an estimated movement time passes from a time of the reception of the destination allocation request information, reads the allocation request information from the storage unit to decide the allocation elevator to which the call relating to the destination allocation request information is to be allocated, and transmits information indicating the decided allocation elevator to the information communication terminal via a predetermined radio communication device.

8. The elevator system according to claim 7, further comprising the card reader.

* * * * *